US006934650B2

(12) United States Patent
Yoshida et al.

(10) Patent No.: US 6,934,650 B2
(45) Date of Patent: Aug. 23, 2005

(54) NOISE SIGNAL ANALYSIS APPARATUS, NOISE SIGNAL SYNTHESIS APPARATUS, NOISE SIGNAL ANALYSIS METHOD AND NOISE SIGNAL SYNTHESIS METHOD

(75) Inventors: Koji Yoshida, Yokohama (JP); Fumitada Itakura, Toyokawa (JP)

(73) Assignee: Panasonic Mobile Communications Co., Ltd., Yokohama (JP)

( * ) Notice: Subject to any disclaimer, the term of this patent is extended or adjusted under 35 U.S.C. 154(b) by 0 days.

(21) Appl. No.: 10/129,076

(22) PCT Filed: Sep. 4, 2001

(86) PCT No.: PCT/JP01/07630

§ 371 (c)(1), (2), (4) Date: May 2, 2002

(87) PCT Pub. No.: WO02/21091

PCT Pub. Date: Mar. 14, 2002

(65) Prior Publication Data

US 2002/0165681 A1 Nov. 7, 2002

(30) Foreign Application Priority Data

Sep. 6, 2000 (JP) ....................................... 2000-270588
Mar. 13, 2001 (JP) ....................................... 2001-070148

(51) Int. Cl.[7] ................................................ G01L 21/02
(52) U.S. Cl. ............................. 702/76; 702/74; 702/75; 704/226
(58) Field of Search ............................... 702/74–77, 79, 702/80, 111, 120, 122, 124–126, FOR 134–139, FOR 154–155, FOR 164, FOR 168; 704/200, 201, 203, 205, 206, 208, 211, 214, 226–228, 240; 381/317–318, 94.1, FOR 115, FOR 124

(56) References Cited

U.S. PATENT DOCUMENTS 4,516,259 A * 5/1985 Yato et al. .................. 704/220
4,720,802 A * 1/1988 Damoulakis et al. ....... 704/233
4,852,181 A * 7/1989 Morito et al. ............... 704/233

(Continued)

FOREIGN PATENT DOCUMENTS

| | | |
|---|---|---|
| JP | 1502779 | 9/1989 |
| JP | 1502853 | 9/1989 |
| JP | 09062299 | 3/1997 |

(Continued)

OTHER PUBLICATIONS

"A Silence Compression Scheme for G.729 Optimized for Terminals Conforming to Recommendation V.70", ITU–T Recommendation G.729–Annex B, Nov. 1996, p. 1.

"Very Low Bit Rate Speech Coding Based on HMMS," Jun Hirol et al., Technical Study Report of the Institute of Electronics, Information and Communication Engineers [Audio], SP98–63, p. 39–44, Sep. 1998.

Japanese Office Action dated Mar. 30, 2004 with partial English translation.

*Primary Examiner*—Carol S. W. Tsai
(74) *Attorney, Agent, or Firm*—Stevens, Davis, Miller & Mosher, LLP

(57) ABSTRACT

FFT section 102 transforms a windowed input noise signal into a frequency spectrum. Spectral model storing section 103 stores model information on spectral models. Spectral model series calculating section 104 calculates spectral model number series corresponding to amplitude spectral series of the input noise signal, using the model information stored in spectral model storing section 103. Duration model/transition probability calculating section 105 outputs model parameters using the spectral model number series calculated in spectral model series calculating section 104. It is thereby possible to synthesize a background noise with perceptual high quality.

19 Claims, 19 Drawing Sheets

U.S. PATENT DOCUMENTS

| | | | | | |
|---|---|---|---|---|---|
| 4,897,878 | A | * | 1/1990 | Boll et al. | 704/233 |
| 4,918,735 | A | * | 4/1990 | Morito et al. | 704/233 |
| 5,054,073 | A | * | 10/1991 | Yazu | 704/230 |
| 5,148,489 | A | * | 9/1992 | Erell et al. | 704/226 |
| 5,465,317 | A | * | 11/1995 | Epstein | 704/236 |
| 5,761,639 | A | * | 6/1998 | Takebayashi et al. | 704/253 |
| 5,805,770 | A | * | 9/1998 | Tsutsui | 701/224 |
| 5,924,065 | A | * | 7/1999 | Eberman et al. | 704/231 |
| 5,978,761 | A | * | 11/1999 | Johansson | 704/226 |
| 6,144,937 | A | * | 11/2000 | Ali | 704/233 |
| 6,182,033 | B1 | * | 1/2001 | Accardi et al. | 704/223 |
| 6,205,421 | B1 | * | 3/2001 | Morii | 704/226 |
| 6,453,285 | B1 | * | 9/2002 | Anderson et al. | 704/210 |
| 6,606,593 | B1 | * | 8/2003 | Jarvinen et al. | 704/223 |
| 2002/0116196 | A1 | * | 8/2002 | Tran | 704/270 |

FOREIGN PATENT DOCUMENTS

| | | |
|---|---|---|
| JP | 09321793 | 12/1997 |
| JP | 10097292 | 4/1998 |
| JP | 10149198 | 6/1998 |
| JP | 10190498 | 7/1998 |
| JP | 11163744 | 6/1999 |
| JP | 11242499 | 9/1999 |

* cited by examiner

NOISE SIGNAL ANALYSIS APPARATUS, NOISE SIGNAL SYNTHESIS APPARATUS, NOISE SIGNAL ANALYSIS METHOD AND NOISE SIGNAL SYNTHESIS METHOD

TECHNICAL FIELD

The present invention relates to a noise signal analysis apparatus and synthesis apparatus for analyzing and synthesizing a background noise signal superimposed on a speech signal, and to a speech coding apparatus for coding the speech signal using the analyzing apparatus and synthesis apparatus.

BACKGROUND ART

In fields of mobile communications and speech storage, for effective utilization of radio signals and storage media, a speech coding apparatus is used that compresses speech information to encode at low bit rates. As a conventional technique in such a speech coding apparatus, there is a CS-ACELP coding scheme with DTX (Discontinuous Transmission) control of ITU-T Recommendation G.729, Annex B ("A silence compression scheme for G.729 optimized for terminals conforming to Recommendation V.70").

FIG. 1 is a block diagram illustrating a configuration of a speech coding apparatus using the conventional CS-ACELP coding scheme with DTX control. In FIG. 1 an input speech signal is input to speech/non-speech determiner 11, CS-ACELP speech coder 12 and non-speech interval coder 13. First, speech/non-speech determiner 11 determines whether the input speech signal is of a speech interval or of a non-speech interval (interval with only a background noise).

When speech/non-speech determiner 11 determines that the signal is of a speech interval, CS-ACELP speech coder 12 performs speech coding on the signal of the speech interval. Coded data of the speech interval is output to DTX control/multiplexer 14.

Meanwhile, when speech/non-speech determiner 11 determines that the signal is of a non-speech interval, non-speech interval coder 13 performs coding on the noise signal of the non-speech interval. Using the input speech signal, non-speech interval coder 13 calculates LPC coefficients the same as in coding of speech interval and LPC prediction residual energy of the input speech signal to output to DTX control/multiplexer 14 as coded data of the non-speech interval. In addition, the coded data of the non-speech interval is transmitted intermittently at an interval at which a predetermined change in characteristics (LPC coefficients or energy) of the input signal is detected.

DTX control/multiplexer 14 controls and multiplexes data to be transmitted as transmit data, and outputs the resultant as transmit data, using outputs from speech/non-speech determiner 11, CS-ACELP speech coder 13 and non-speech interval coder 13.

The conventional speech coder as described above has the effect of decreasing an average bit rate of transmit signals by performing coding only at a speech interval of an input speech signal using a CS-ACELP speech coder, while at a non-speech interval (interval with only noise) of the input speech signal, performing coding intermittently using a dedicated non-speech interval coder with a number of bits fewer than in the speech coder.

However, in the above-mentioned conventional speech coding method, due to facts as described below, a receiving-side apparatus that receives data coded in a transmitting-side apparatus has a problem that the quality of a decoded signal corresponding to a noise signal at a non-speech interval deteriorates. That is, a first fact is that the non-speech interval coder (noise signal analyzing/coding section) in the transmitting-side apparatus performs coding with the same signal model as in the speech coder (generates a decoded signal by applying an AR type of synthesis filter (LPC synthesis filter) to a noise signal per short-term (approximately 10 to 50 ms) basis).

A second factor is that the receiving-side apparatus synthesizes (generates) a noise using the coded data obtained by intermittently analyzing an input noise signal in the transmitting-side apparatus.

DISCLOSURE OF INVENTION

It is an object of the present invention to provide a noise signal synthesis apparatus capable of synthesizing a background noise signal with perceptually high quality.

The object is achieved by representing a noise signal with statistical models. Specifically, using a plurality of stationary noise models representative of an amplitude spectral time series following a statistical distribution with a duration of the amplitude spectral time series following another statistical distribution, a noise signal is represented as a spectral series statistically transiting between the stationary noise models.

BEST MODE FOR CARRYING OUT THE INVENTION

Embodiments of the present invention will be described below with reference to accompanying drawings.

(First Embodiment)

In the present invention, a noise signal is represented with statistical models. That is, using a plurality of stationary noise models representative of an amplitude spectral time series following a statistical distribution with a duration of the amplitude spectral time series following another statistical distribution, a noise signal is represented as a spectral series statistically transiting between the stationary noise models.

More specifically, a stationary noise spectrum is represented by amplitude spectral time series {Si(n)} (n=1, . . . , Li, i=1, . . . , M) with M spectral models. Li indicates a duration (herein unit time is of a number of frames) of each amplitude spectral time series {Si(n)}. It is assumed that each of {Si(n)} and Li follows a statistical distribution indicated by normal distribution. Then, a background noise is represented as a spectral series transiting between the spectral time series models {Si(n)} with a transition probability of p(i,j) (i,j=1, . . . , M).

Figure 1:
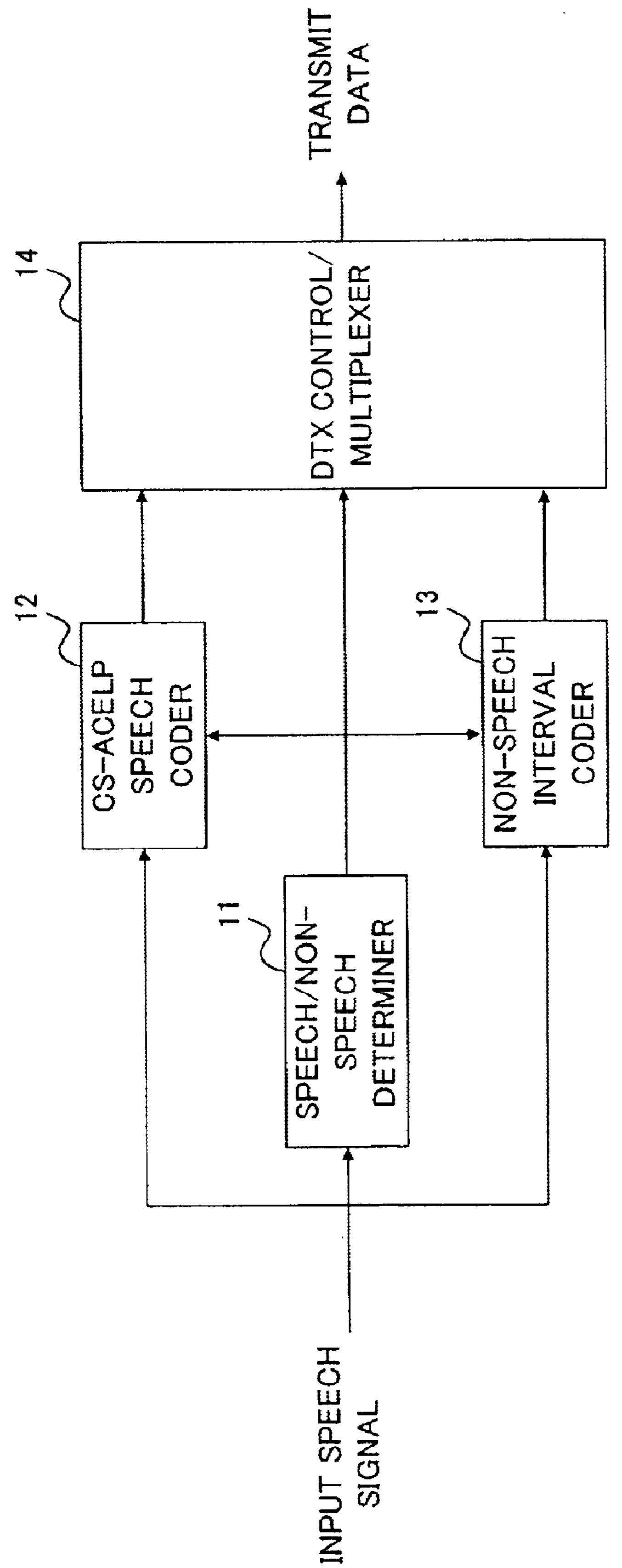
FIG. 1 is a block diagram illustrating a configuration of a coding apparatus using a conventional CS-ACELP coding scheme with DTX control.
Figure 2:
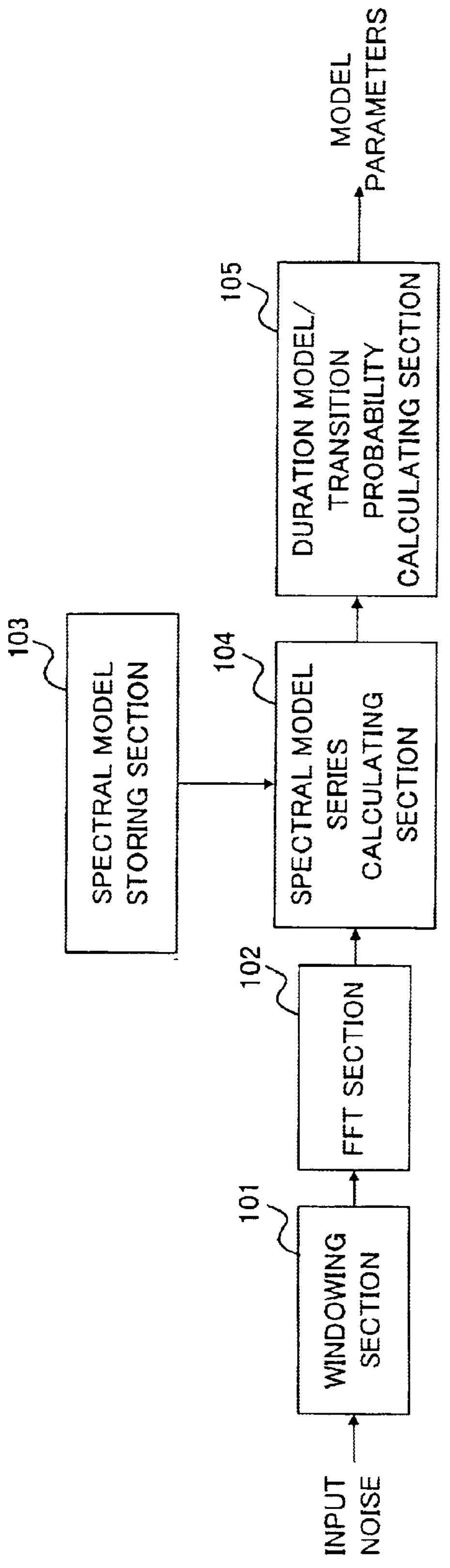
FIG. 2 is a block diagram illustrating a configuration of a noise signal analysis apparatus according to a first embodiment of the present invention.

FIG. 2 is a block diagram illustrating a configuration of a noise signal analysis apparatus according to the first embodiment of the present invention. In the noise signal analysis apparatus illustrated in FIG. 2, with respect to input noise signal x(j) (j=0, . . . , N−1; N: analysis length) corresponding to m-th frame (m=0,1,2, . . . ) input for each predetermined interval (hereinafter referred to as "frame"), windowing section 101 performs windowing, for example, using a Hanning window. FFT (Fast Fourier Transform) section 102 transforms the windowed input noise signal into a frequency spectrum, and calculates input amplitude spectrum X(m) of the m-th frame.

Using model information on spectral model Si (i=1, . . . , M) stored in spectral model storing section 103, spectral model series calculating section 104 calculates spectral model number series {index(m)} (1≦index(m)≦M, m=0,1,2, . . . ) corresponding to amplitude spectral series {X(m)} (m=0,1,2, . . . ) of the input noise signal. The model information on spectral model Si (i=1, . . . , M) includes average amplitude Sav_i and standard deviation Sdv_i that are statistical parameters of Si. It is possible to prepare those in advance by learning. The corresponding spectral number model series is calculated by obtaining number i of spectral model Si having average amplitude Sav_i such that the distance from input amplitude spectrum X(m) is the least.

Using spectral model number series {index(m)} obtained in spectral model series calculating section 104, duration model/transition probability calculating section 105 calculates statistical parameters (average value Lav_i and standard deviation Ldv_i of Li) concerning number-of-successive frames Li corresponding to each Si and transition probability p(i,j) between Si and Sj to output as model parameters of the input noise signal. In addition, these model parameters are calculated and transmitted at predetermined intervals or at arbitrary intervals.

Figure 3:
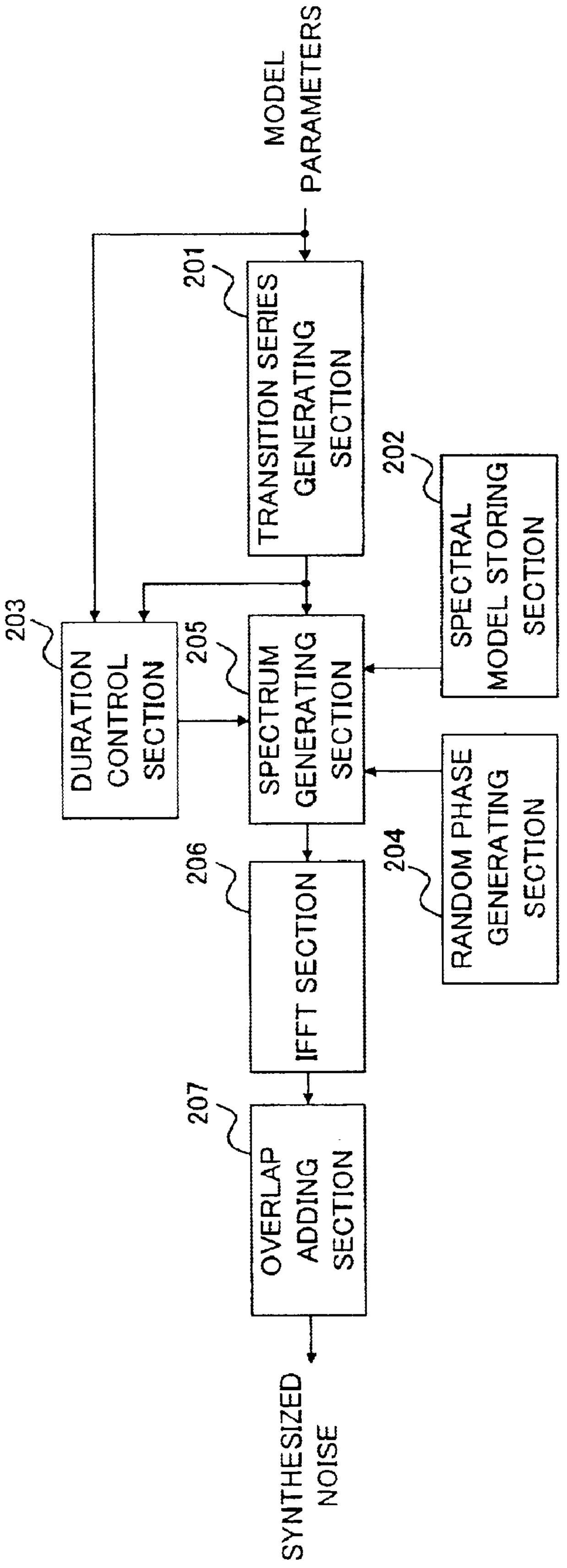
FIG. 3 is a block diagram illustrating a configuration of a noise signal synthesis apparatus according to the first embodiment of the present invention.

FIG. 3 is a block diagram illustrating a configuration of a noise signal synthesis apparatus according to the first embodiment of the present invention. In the noise signal synthesis apparatus illustrated in FIG. 3, using transition probability p(i,j) between Si and Sj among model parameters (average value Lav_i and standard deviation Ldv_i of Li and transition probability p(i,j) between Si and Sj) obtained in the noise signal analysis apparatus illustrated in FIG. 2, generated is spectral model number transition series {index'(l)} (1≦index'(l)≦M, l=0,1,2, . . . ) such that the transition of spectral model Si becomes given transition probability p(i,j).

Using model number index'(l) obtained in transition series generating section 201 and the model information (average amplitude Sav_i and standard deviation Sdv_i of Si) on spectral model Si (i=1, . . . , M) stored in spectral model storing section 202, spectrum generating section 205 generates amplitude spectral time series {X'(n)}, indicated in the following equation, corresponding to index'(l):

$$\{x'(n)\}=\{S_{index'(l)}(n)\},\ n=1,2,\ldots,L \tag{1}$$

Herein, it is assumed that $S_{index'(l)}$ follows a normal distribution with average amplitude Sav_i and standard deviation Sdv_i with respect to i=index'(l), and number-of-successive frames L is controlled in duration control section 203 to follow a normal distribution with average value Lav_i and standard deviation Ldv_i with respect to i=index'(l), using statistical model parameters (average value Lav_i and standard deviation Ldv_i of Li) of number-of-successive frames Li corresponding to spectral model Si output from the noise signal analysis apparatus.

Further, according to the above method, spectrum generating section 205 adds random phases generated in random phase generating section 204 to the amplitude spectral time series with a predetermined time duration (a number of frames) generated according to transition series {index'(l)} to generate a spectral time series. In addition, spectrum generating section 205 may perform smoothing on the generated amplitude spectral time series so that the spectrum varies smoothly.

IFFT (Inverse Fast Fourier Transform) section 206 transforms the spectral time series generated in spectrum generating section 205 into a waveform of time domain. Overlap adding section 207 superimposes overlapping signals between frames, and thereby outputs a final synthesized noise signal.

Figure 4:
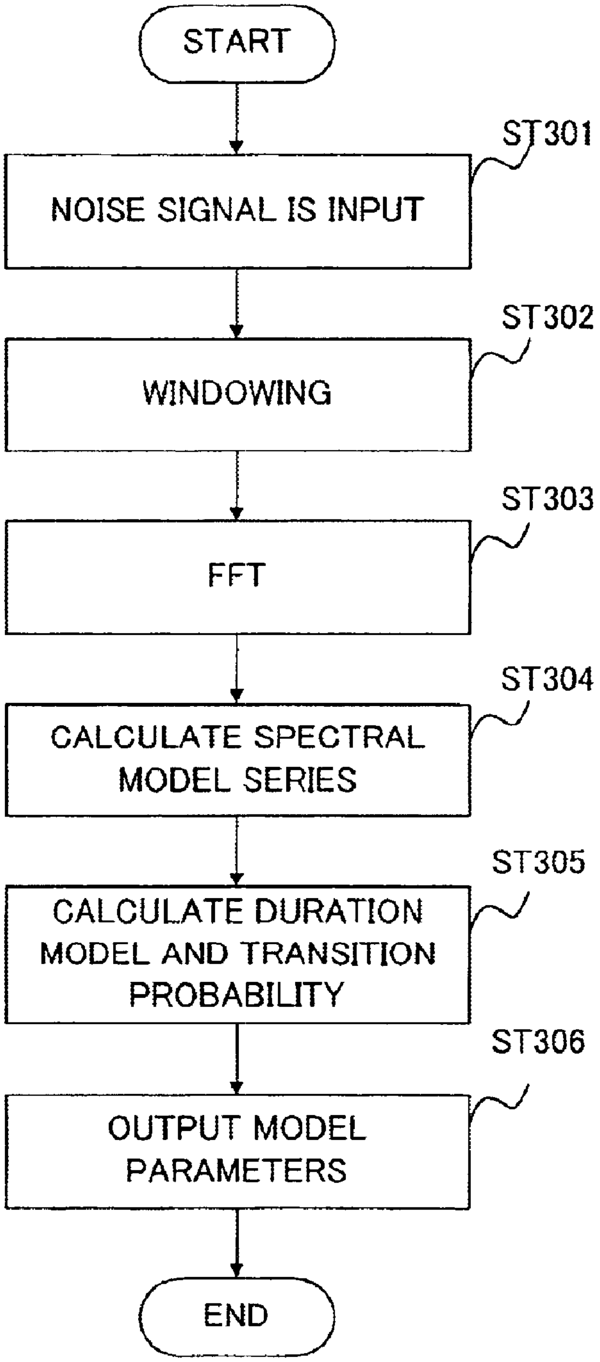
FIG. 4 is a flow diagram showing the operation of the noise signal analysis apparatus according to the first embodiment of the present invention.
Figure 5:
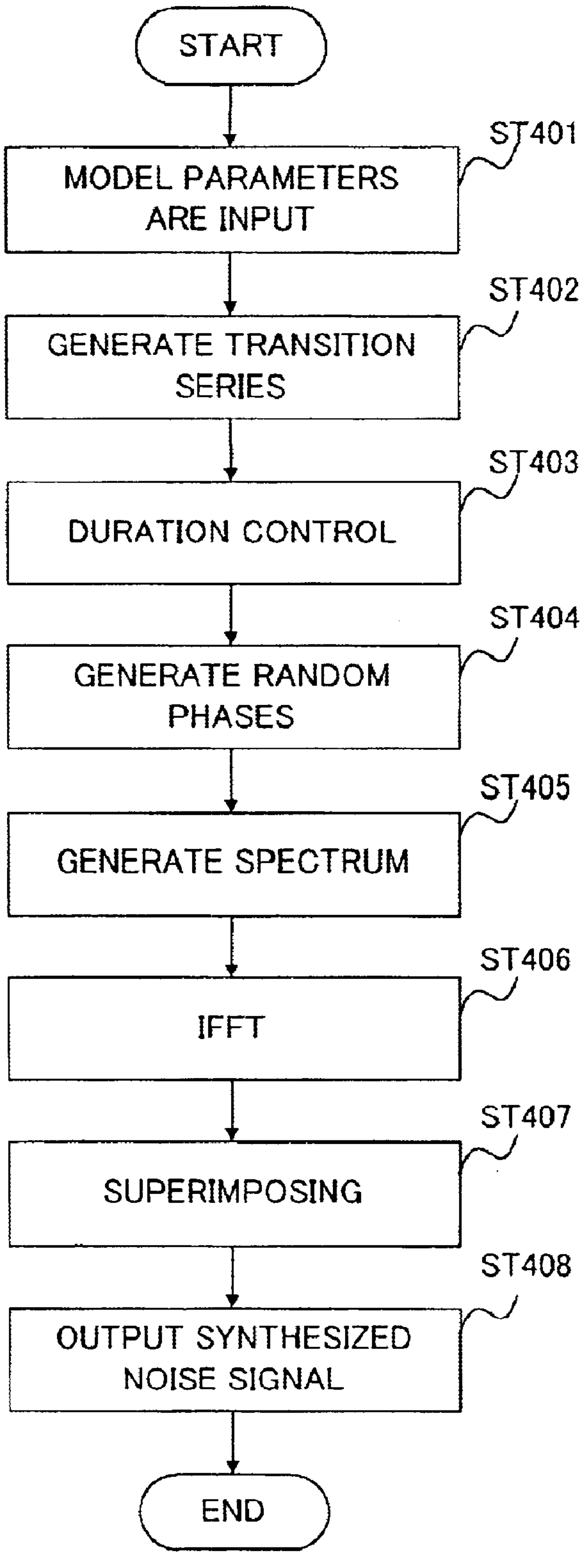
FIG. 5 is a flow diagram showing the operation of the noise signal synthesis apparatus according to the first embodiment of the present invention.

Operations of the noise signal analysis apparatus and noise signal synthesis apparatus with the above configurations will be described below with reference to FIGS. 4 and 5. FIG. 4 is a flow diagram showing the operation of the noise signal analysis apparatus according to the first embodiment of the present invention. FIG. 5 is a flow diagram showing the operation of the noise signal synthesis apparatus according to the first embodiment of the present invention.

First, the operation of the noise signal analysis apparatus according to this embodiment will be described with reference to FIG. 4. In step (hereinafter referred to as "ST") 301, noise signal x(j) (j=0, . . . , N−1; N: analysis length) for each frame is input to windowing section 101. In ST302 windowing section 101 performs windowing, for example, using a Hamming window, on the input noise signal corresponding to m-th frame (m=0,1,2, . . . ). In ST303 FFT section 102 performs FFT (Fast Fourier Transform) on the windowed input noise signal to transform into a frequency spectrum. Input amplitude spectrum X(m) of the m-th frame is thereby calculated.

In ST304, using model information on spectral model Si(i=1, . . . , M), spectral model series calculating section 104 calculates spectral model number series {index(m) } (1≦index(m)≦M, m=0,1,2, . . . ) corresponding to amplitude spectral series {X(m)} (m=0,1,2, . . . ) of the input noise signal.

The model information on spectral model Si (i=1, . . . , M) includes average amplitude Sav_i and standard deviation Sdv_i that are statistical parameters of Si. It is possible to prepare those in advance by learning. The corresponding spectral number model series is calculated by obtaining number i of spectral model Si having average amplitude Sav_i such that the distance from input amplitude spectrum X(m) is the least. The processing of ST301 to ST304 is performed for each frame.

In ST305, using spectral model number series {index(m)} obtained in ST304, duration model/transition probability calculating section 105 calculates statistical parameters (average value Lav_i and standard deviation Ldv_i of Li) concerning number-of-successive frames Li corresponding to each Si and transition probability p(i,j) between Si and Sj. In ST306, these values are output as model parameters corresponding to input noise signal. In addition, these parameters are calculated and transmitted at predetermined intervals or at arbitrary intervals.

The operation of the noise signal analysis apparatus according to this embodiment will be described with reference to FIG. 5. First in ST401, model parameters (average value Lav_i and standard deviation Ldv_i of Li and transition probability p(i,j) between Si and Sj) obtained in the noise signal analysis apparatus are input to transition series generating section 201 and duration control section 203.

In ST402, using transition probability p(i,j) between Si and Sj among the input model parameters, transition series generating section 201 generates spectral model number transition series {index'(l)} (1≦index'(l)≦M, l=0,1,2, . . . ) such that the transition of spectral model Si becomes given transition probability p(i,j).

In ST403, using statistical model parameters (average value Lav_i and standard deviation Ldv_i of Li) of number-of-successive frames Li corresponding to spectral model Si among the input model parameters, duration control section 203 generates number-of-successive frames L controlled to follow a normal distribution with average value Lav_i and standard deviation Ldv_i with resect to i=index'(l). In ST404 random phase generating section 204 generates random phases.

In ST405, using model number index'(l) obtained in ST402 and model information (average amplitude Sav_i and standard deviation Sdv_i of Si) on spectral model Si (i=1, . . . , M) that is prepared in advance, spectrum generating section 205 generates amplitude spectral time series {X'(n)}, indicated in equation (1), corresponding to index'(l). In addition, spectrum generating section 205 may perform smoothing on the generated amplitude spectral time series so that the spectrum varies smoothly.

Herein, it is assumed that $S_{index'(l)}$ follows a normal distribution with average amplitude Sav_i and standard deviation Sdv_i with respect to i=index'(l), and number-of-successive frames L is generated in ST404.

Further, the amplitude spectral time series with a predetermined time duration (a number of frames) generated according to transition series {index'(l)} is given random phases generated in ST404, and thereby the spectral time series is generated.

In ST406 IFFT section 206 transforms the generated spectral time series into a waveform of time domain. In ST407 overlap adding section 207 superimposes over lapping signals between frames. In ST408 the super imposed signal is output as a final synthesized noise signal.

Thus, in this embodiment, a background noise is represented with statistical models. In other words, using a noise signal, the noise signal analysis apparatus (transmitting-side apparatus) generates statistical information (statistical model parameters) including spectral variations in the noise signal spectrum, and transmits the generated information to a noise signal synthesis apparatus (receiving-side apparatus). Using the information (statistical model parameters) transmitted from the noise signal analysis apparatus (transmitting-side apparatus), the noise signal synthesis apparatus (receiving-side apparatus) synthesizes a noise signal. In this way, the noise signal synthesis apparatus (receiving-side apparatus) is capable of using statistical information including spectral variations in the noise signal spectrum, instead of using a noise signal spectrum analyzed intermittently, to synthesize a noise signal, and thereby is capable of synthesizing a noise signal with less perceptual deterioration.

In addition, while this embodiment explains the above contents using a noise signal analysis apparatus and synthesis apparatus with configurations illustrated respectively in FIGS. 2 and 3 and a noise signal analysis method and synthesis method shown respectively in FIGS. 4 and 5, it may be possible to achieve the above contents with another means without departing from the spirit of the present invention. For example, while it is explained in the above embodiment that as spectral model information, statistical models (average and standard deviation of S) of spectrum S is prepared in advance by learning, it may be possible to learn on real time an input noise signal or quantize with spectral representative parameters such as LPC coefficients, to transmit to a synthesizing side. Further, it may be possible to prepare patterns of statistical parameters (average Lav and standard deviation Ldv of L) of spectral duration and statistical transition parameters between spectral models Si, select an appropriate one from the patterns corresponding to input noise signal during a predetermined period to transmit, and based on the pattern, synthesize a noise signal.

(Second Embodiment)

This embodiment explains a case where a speech coding apparatus is achieved using the noise signal analysis apparatus as described in the first embodiment, and a speech decoding apparatus is achieved using the noise signal synthesis apparatus as described in the first embodiment.

Figure 6:
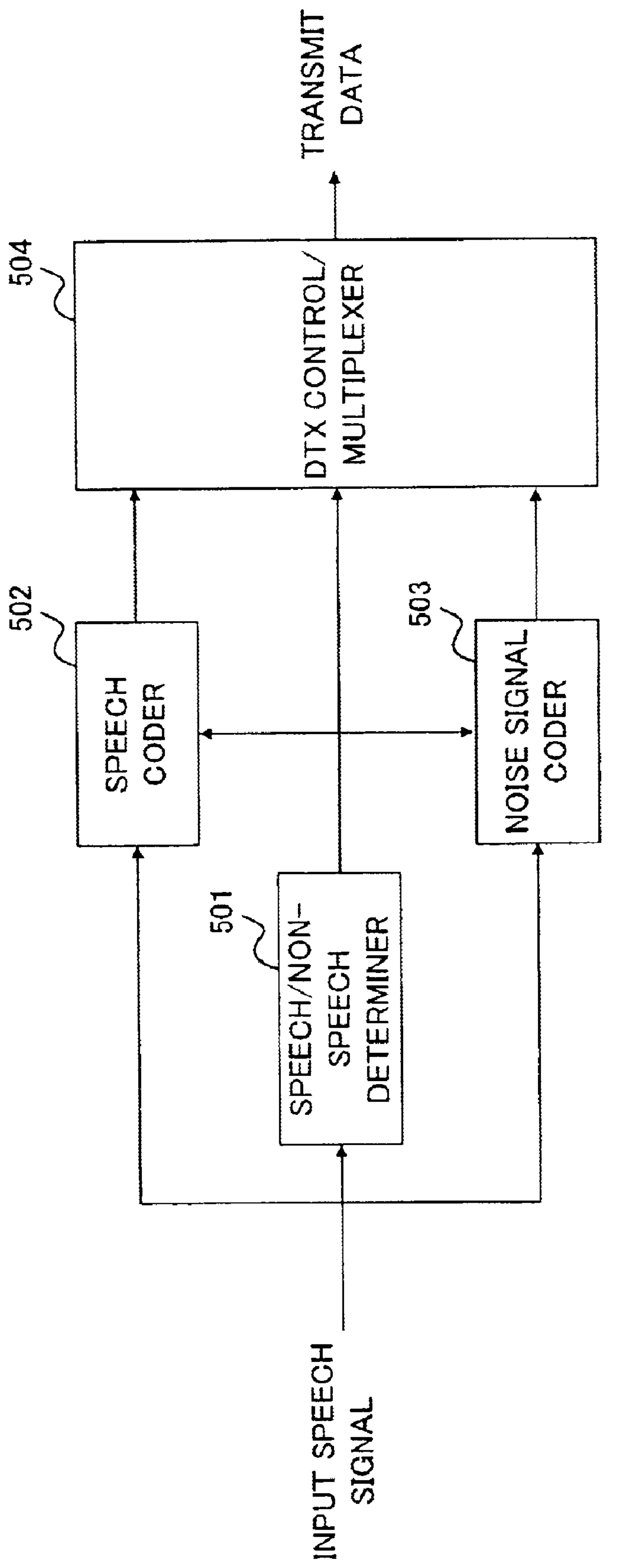
FIG. 6 is a block diagram illustrating a configuration of a speech coding apparatus according to a second embodiment of the present invention.

The speech coding apparatus according to this embodiment will be described below with reference to FIG. 6. FIG. 6 is a block diagram illustrating a configuration of the speech coding apparatus according to the second embodiment of the present invention. In FIG. 6 an input speech signal is input to speech/non-speech determiner 501, speech coder 502 and noise signal coder 503.

Speech/non-speech determiner 501 determines whether the input speech signal is of a speech interval or non-speech interval (interval with only a noise), and outputs a determination. Speech/non-speech determiner 501 may be an arbitrary one, and in general, one using momentary amounts, variation amounts or the like of a plurality of parameters such as power, spectrum and pitch period of the input signal to make a determination.

When speech/non-speech determiner 501 determines that the input speech signal is of speech, speech coder 502 performs speech coding on the input speech signal, and outputs coded data to DTX control/multiplexer 504. Speech coder 502 is one for speech interval, and is an arbitrary coder that encodes speech with high efficiency.

When speech/non-speech determiner 501 determines that the input speech signal is of non-speech, noise signal coder 503 performs noise signal coding on the input speech signal, and outputs model parameters corresponding to the input noise signal. Noise signal coder 503 is obtained by adding a configuration for outputting coded parameter resulting from the quantization and coding of output model parameters to the noise signal analysis apparatus (see FIG. 2) as described in the first embodiment.

Using outputs from speech/non-speech determiner 501, speech coder 502 and noise signal coder 503, DTX control/multiplexer 504 controls information to be transmitted as transmit data, multiplexes transmit information, and outputs the transmit data.

Figure 7:
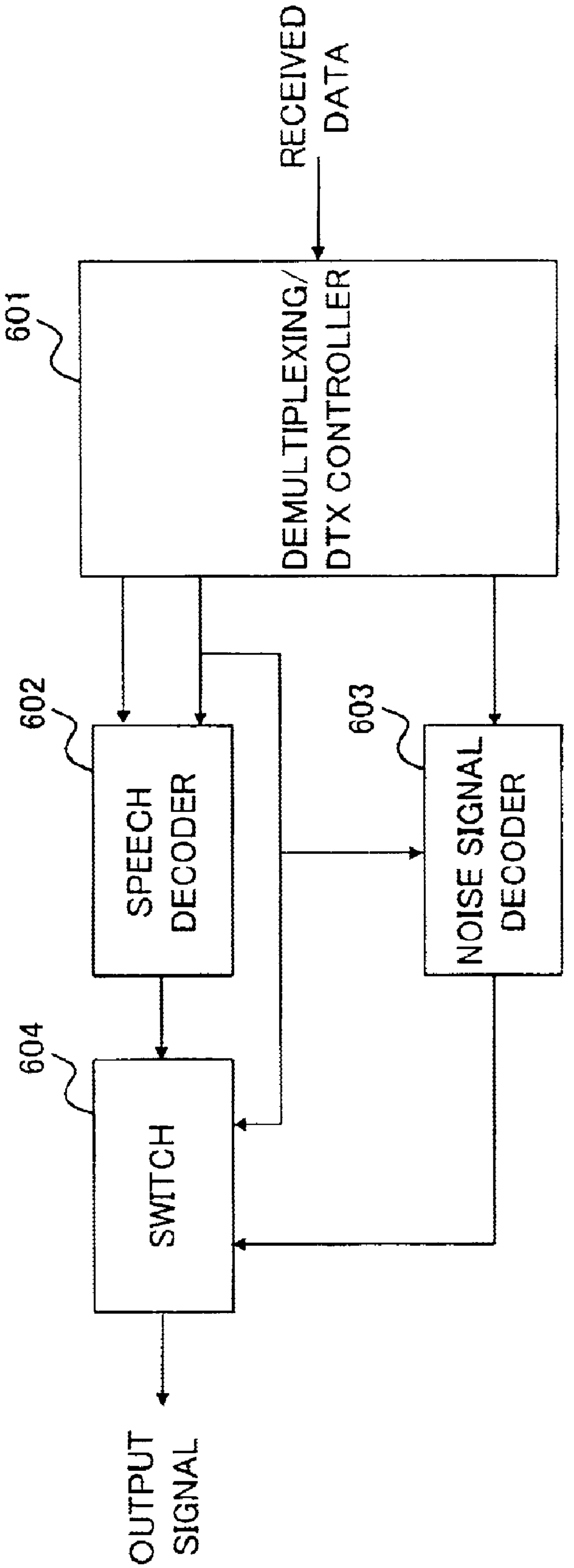
FIG. 7 is a block diagram illustrating a configuration of a speech decoding apparatus according to the second embodiment of the present invention.

The speech decoding apparatus according to the second embodiment of the present invention will be described below with reference to FIG. 7. FIG. 7 is a block diagram illustrating a configuration of the speech decoding apparatus according to the second embodiment of the present invention. In FIG. 7 transmit data transmitted from the speech coding apparatus illustrated in FIG. 6 is input to demultiplexing/DTX controller 601 as received data.

Demultiplexing/DTX controller 601 demultiplexes the received data into speech coded data or noise model coded parameters and a speech/non-speech determination flag required for speech decoding and noise generation.

When the speech/non-speech determination flag is indicative of speech interval, speech decoder 602 performs speech decoding using the speech coded data, and outputs a decoded speech. When the speech/non-speech determination flag is indicative of non-speech interval, noise signal decoder 603 generates a noise signal using the noise model coded parameters, and outputs the noise signal. Noise signal decoder 603 is obtained by adding a configuration for decoding input model coded parameters into respective model parameters to the noise signal synthesis apparatus (FIG. 2) as described in the first embodiment.

Output switch 604 switches outputs of speech decoder 602 and noise signal decoder 603 corresponding to the result of speech/non-speech flag to output as an output signal.

Figure 8:
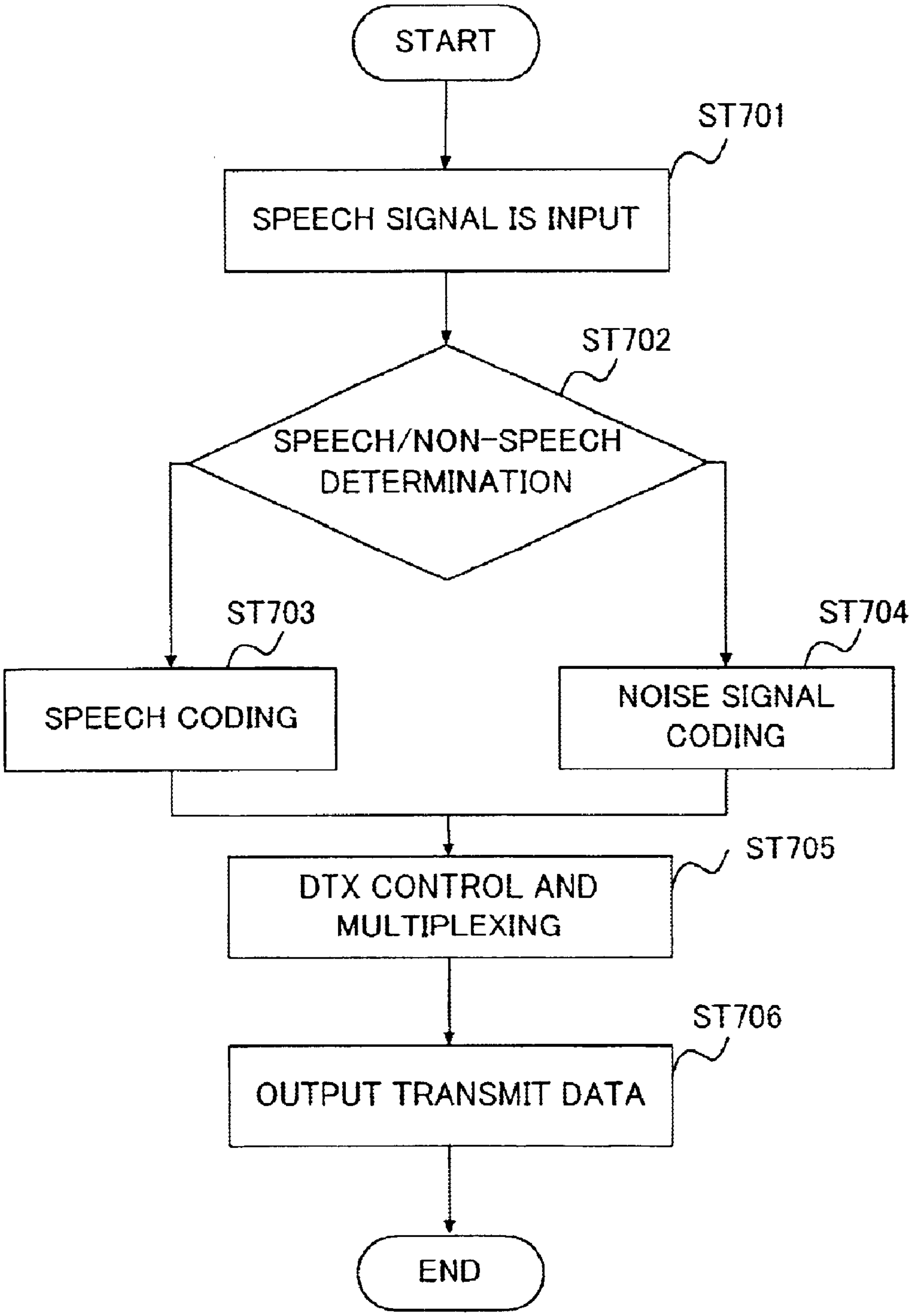
FIG. 8 is a flow diagram showing the operation of the speech coding apparatus according to the second embodiment of the present invention.

Operations of the speech coding apparatus and speech decoding apparatus with the above configurations will be described below. First, the operation of the speech coding apparatus will be described with reference to FIG. 8. FIG. 8 is a flow diagram showing the operation of the speech coding apparatus according to the second embodiment of the present invention.

In ST701 a speech signal for each frame is input. In ST702 the input speech signal is determined as a speech interval or non-speech interval (interval with only a noise), and a determination is output. The speech/non-speech determination is made by arbitrary method, and in general, is made using momentary amounts, variation amounts or the like of a plurality of parameters such as power, spectrum and pitch period of the input signal.

When the speech/non-speech determination is indicative of speech in ST702, in ST703 speech coding is performed on the input speech signal, and the coded data is output. The speech coding processing is coding for speech interval and is performed by arbitrary method for coding a speech with high efficiency.

Meanwhile, when the speech/non-speech determination is indicative of non-speech, in ST704 noise signal coding is performed on the input speech signal, and model parameters corresponding to the input noise signal are output. The noise signal coding is obtained by adding steps for outputting coded parameter resulting from the quantization and coding of output model parameters to the noise signal analysis method as described in the first embodiment.

Figure 9:
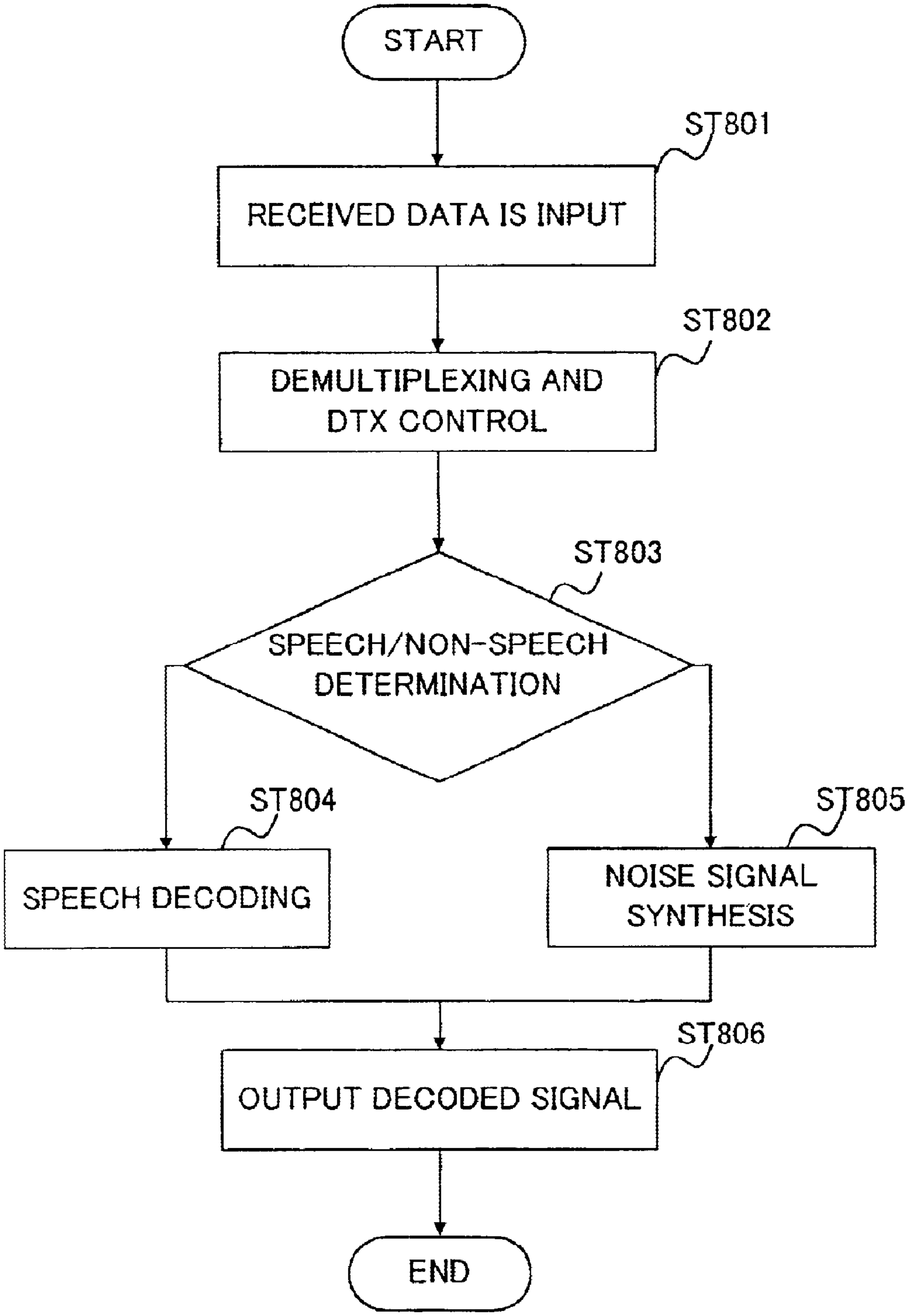
FIG. 9 is a flow diagram showing the operation of the speech decoding apparatus according to the second embodiment of the present invention.

In ST705 using outputs of speech/non-speech determination, speech coding and noise signal coding, information to be transmitted as transmit data is controlled (DTX control), and transmit information is multiplexed. In ST706 the resultant is output as the transmit data The operation of the speech decoding apparatus will be described below with reference to FIG. 9. FIG. 9 is a flow diagram showing the operation of the speech decoding apparatus according to the second embodiment of the present invention.

In ST801 transmit data obtained by coding an input signal at a coding side is input as received data. In ST802 the received data is demultiplexed into speech coded data or noise model coded parameters and a speech/non-speech determination flag required for speech decoding and noise generation.

When the speech/non-speech determination flag is indicative of speech interval, in ST804 speech decoding is performed using the speech coded data, and a decoded speech is output. When the speech/non-speech determination flag is indicative of non-speech interval, in ST805 a noise signal is generated using the noise model coded parameters, and a noise signal is output. The noise signal decoding processing is obtained by adding steps for decoding input model coded parameters into respective model parameters to the noise signal synthesis method as described in the first embodiment.

In ST806 corresponding to the result of speech/non-speech flag, an output of speech decoding in ST804 or of noise signal decoding in ST805 is output as a decoded signal.

Thus, according to this embodiment, speech coding enabling coding of a speech signal with high quality is performed at a speech interval, while at a non-speech interval, a noise signal is coded and decoded using a noise signal analysis apparatus and synthesis apparatus with less perceptual deterioration. It is thereby possible to perform coding of high quality even in circumstances with a background noise. Further, since statistical characteristics of a noise signal of an actual surrounding noise is expected to be constant over a relatively long period (for example, a few seconds to a few tens seconds), it is sufficient to set a transmit period of model parameters at such a long period. Therefore, an information amount of model parameters of a noise signal to be transmitted to a decoding side is reduced, and it is possible to achieve efficient transmission.

(Third Embodiment)

Figure 10:
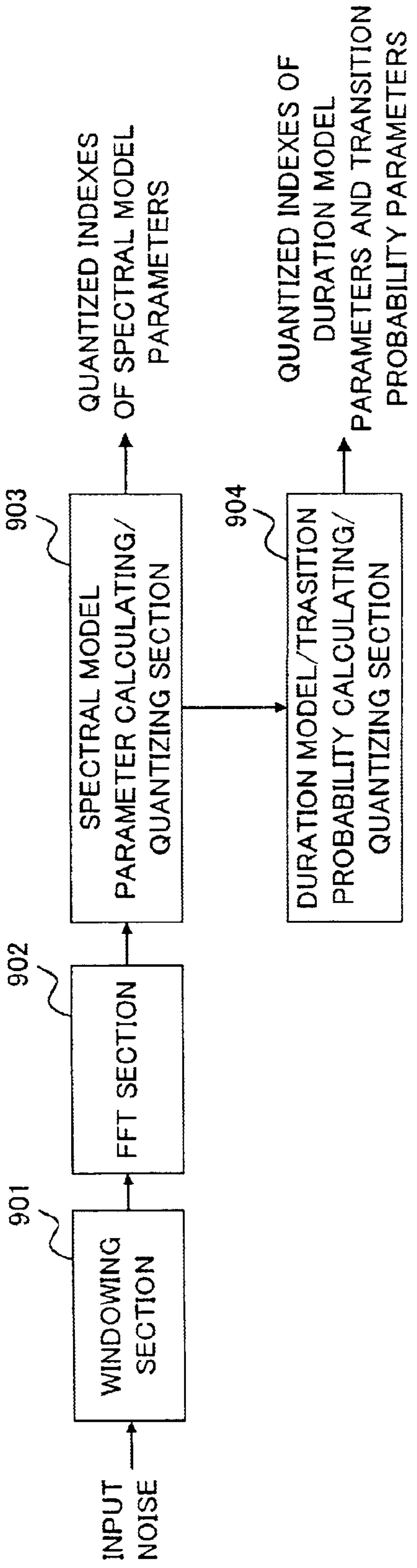
FIG. 10 is a block diagram illustrating a configuration of a noise signal analysis apparatus according to a third embodiment of the present invention.

FIG. 10 is a block diagram illustrating a configuration of a noise signal analysis apparatus according to the third embodiment of the present invention.

Also in this embodiment, a stationary noise spectrum is represented by amplitude spectral time series {Si(n)} (n=1, . . . , Li, i=1, . . . , M) with M models composed of duration (a number of frames) Li (it is assumed that each of {Si(n)} and Li follows a normal distribution), and a background noise is represented as a spectral series transiting between the spectral time series models {Si(n)} with a transition probability of p(i,j)(i,j=1, . . . , M).

In the noise signal analysis apparatus illustrated in FIG. 10, with respect to input noise signal x(j) (j=0, . . . , N−1; N: analysis length) corresponding to m-th frame (m=0,1,2, . . . ) input for each predetermined interval (hereinafter referred to as "frame"), windowing section 101 performs windowing, for example, using a Hanning window. FFT (Fast Fourier Transform) section 902 transforms the windowed input noise signal into a frequency spectrum, and calculates input amplitude spectrum X(m) of the m-th frame. Spectral model parameter calculating/quantizing section 903 divides amplitude spectral series {X(m)} (m=0,1,2, . . . ) of the input noise signal into intervals with a predetermined number of frames or intervals with a number of frames adaptively determined according to some measure, uses each of the intervals as a unit interval (modeling interval) to model, calculates and quantizes spectral model parameters at the modeling interval, and outputs quantized indexes of the spectral model parameters. Further, the section 903 outputs spectral model number series {index (m)} (1≦index(m)≦M, m=mk, mk+1, mk+2, . . . , mk+NFRM−1; mk is a head frame number of a modeling interval, and NFRM is the number of frames at the modeling interval) corresponding to amplitude spectral series {X(m)} (m=0,1,2, . . . ) of the input noise signal. The spectral model parameters include average amplitude Sav_i and standard deviation Sdv_i that are statistical parameters of spectral model Si (i=l, . . . , M). A configuration of spectral model parameter calculating/quantizing section 903 will be described specifically later with reference to FIG. 11.

Using spectral model number series {index(m)} of the modeling interval obtained in spectral model parameter calculating/quantizing section 903, duration model/transition probability calculating/quantizing section 904 calculates and quantizes statistical parameters (duration model parameters) (average value Lav_i and standard deviation Ldv_i of Li) concerning number-of-successive frames Li corresponding to each Si and transition probability p(i,j) between Si and Sj, and outputs their quantized indexes. While an arbitrary quantizing method is capable of being used, each element of Lav_i, Ldv_i and p(i,j) may undergo scalar-quantization.

The section 904 outputs the spectral model parameters, duration model parameters, and transition probability parameters as statistical model parameter quantized indexes of the input noise signal at the modeling interval.

Figure 11:
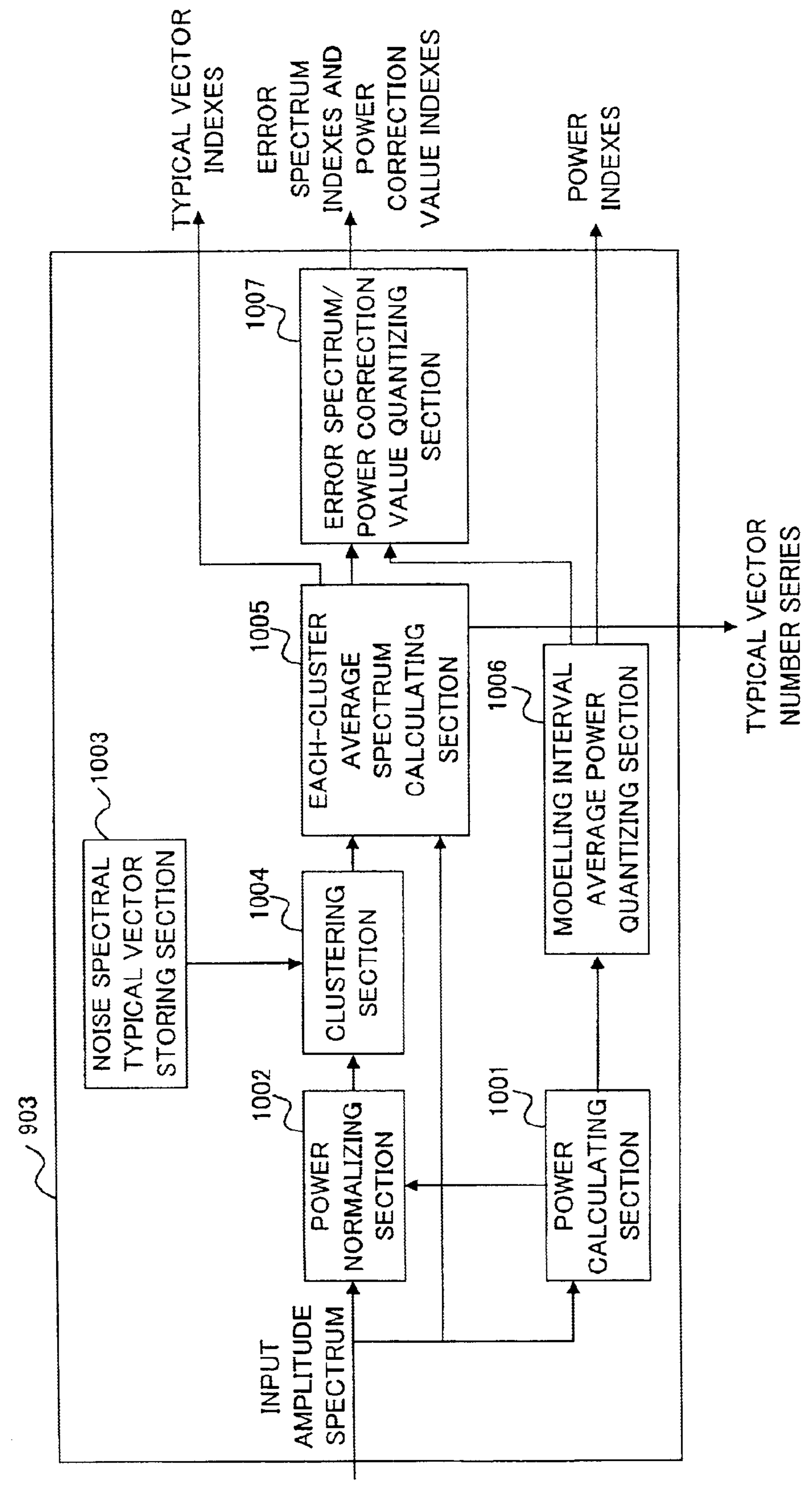
FIG. 11 is a block diagram illustrating a configuration of a spectral model parameter calculating/quantizing section according to the third embodiment of the present invention.

FIG. 11 is a block diagram illustrating a specific configuration of spectral model parameter calculating/quantizing section 903. The section 903 in this embodiment selects, from among typical vector sets of amplitude spectra representative of noise signals prepared in advance, a number (M) of models of typical vector suitable for representing the input amplitude spectral time series at the modeling interval of the input noise, and based on the models, calculates and quantizes spectral model parameters.

First, with respect to input amplitude spectrum X(m)(m=mk, mk+1, mk+2, . . . , mk+NFRM−1) of unit frame at the modeling interval, power normalizing section 1002 normalizes the power using power values obtained in power calculating section 1001. Clustering section 1004 clusters (vector-quantizes) the input amplitude spectra with normalized power into clusters each having as a cluster center a respective typical vector in noise spectral typical vector storing section 1003, and outputs information indicative of which cluster each of the input spectra belongs to. It is herein assumed that noise spectral typical vector storing section 1003 generates, as typical vectors, amplitude spectra of typical noise signals in advance by learning to store, and that the number of typical vectors is not less than the number (M) of models. Then, among series with cluster (typical vectors) numbers to which the input spectra belong obtained in clustering section 1004, each cluster average spectrum calculating section 1005 selects higher-ranked M clusters (a corresponding typical vector is referred to as Ci (i=1,2, . . . M)) in descending order of frequency of belonging at the modeling interval, and calculates for each cluster an average spectrum of the input noise amplitude spectrum belonging to each of the clusters to prepare as average amplitude spectra Sav_i (i=1,2, . . . , M) of the spectral models. Further, the section 903 outputs spectral model number series {index (m)} (1≦index(m)≦M, m=mk, mk+1, mk+2, . . . , mk+NFRM−1) corresponding to amplitude spectral series {X(m)} of the input noise signal. The section 903 generates the number series as the number series belonging to higher-ranked M clusters, based on the series of cluster (typical vector) numbers to which the input spectra belong obtained in clustering section 1004. In other words, with respect to frames which do not belong to the higher-ranked M clusters, the section 903 associates the frames with numbers of the higher-ranked M clusters according to an arbitrary method (for example, re-clustering or replacing the number with a cluster number of a previous frame), or deletes such a frame from the series. Then, modeling interval average power quantizing section 1006 averages the power values calculated for each frame in power calculating section 1001 over the entire modeling interval, quantizes the average power using an arbitrary method such as scalar-quantization, and outputs power indexes and modeling interval average power value (quantized value) E. Error spectrum/power correction value quantizing section 1007 represents Sav_i as indicated in equation (2) using corresponding typical vector Ci, error spectrum di from Ci, modeling interval average power E and power correction value ei for E of each spectral model, and quantizes di and ei using an arbitrary method such as scalar-quantization.

$$Sav\_i = \mathrm{sqrt}(E)\cdot ei\cdot(Ci+di)\ (i=1, \ldots, M) \tag{2}$$

It may be possible to quantize error spectrum di by dividing di into a plurality of bands and performing scalar-quantization on an average value of each band. Thus, as quantized indexes of spectral model parameters, the section 903 outputs M-typical vector indexes obtained in each-cluster average spectrum calculating section 1005, error spectrum quantized indexes and power correction value quantized indexes obtained in error spectrum/power correction value quantizing section 1007, and power quantized indexes obtained in modeling interval average power quantizing section 1006.

In addition, as standard deviation Sdv_i among the spectral model parameters, the section 903 uses an inner-cluster standard deviation value corresponding to Ci obtained in learning noise spectral typical vectors. Storing the value in advance in the noise spectral typical vector storing section eliminates the need of outputting quantized indexes. Further, it may be possible that each-cluster average spectrum calculating section 1005 calculates the standard deviation in the cluster also to quantize in calculating the average spectrum. In this case, the section 903 outputs the quantized indexes as part of the quantized indexes of the spectral model parameters.

In addition, while the above embodiment explains the quantization of error spectrum using scalar-quantization for each band, it may be possible to perform another quantization method such as vector-quantization on the entire band. Further, while it is explained that the power information is represented by average power of a modeling interval and correction value for average power for each model, it may be possible to represent the power information by only the power for each model or to uses the average power of a modeling interval as power of all the models.

Figure 12:
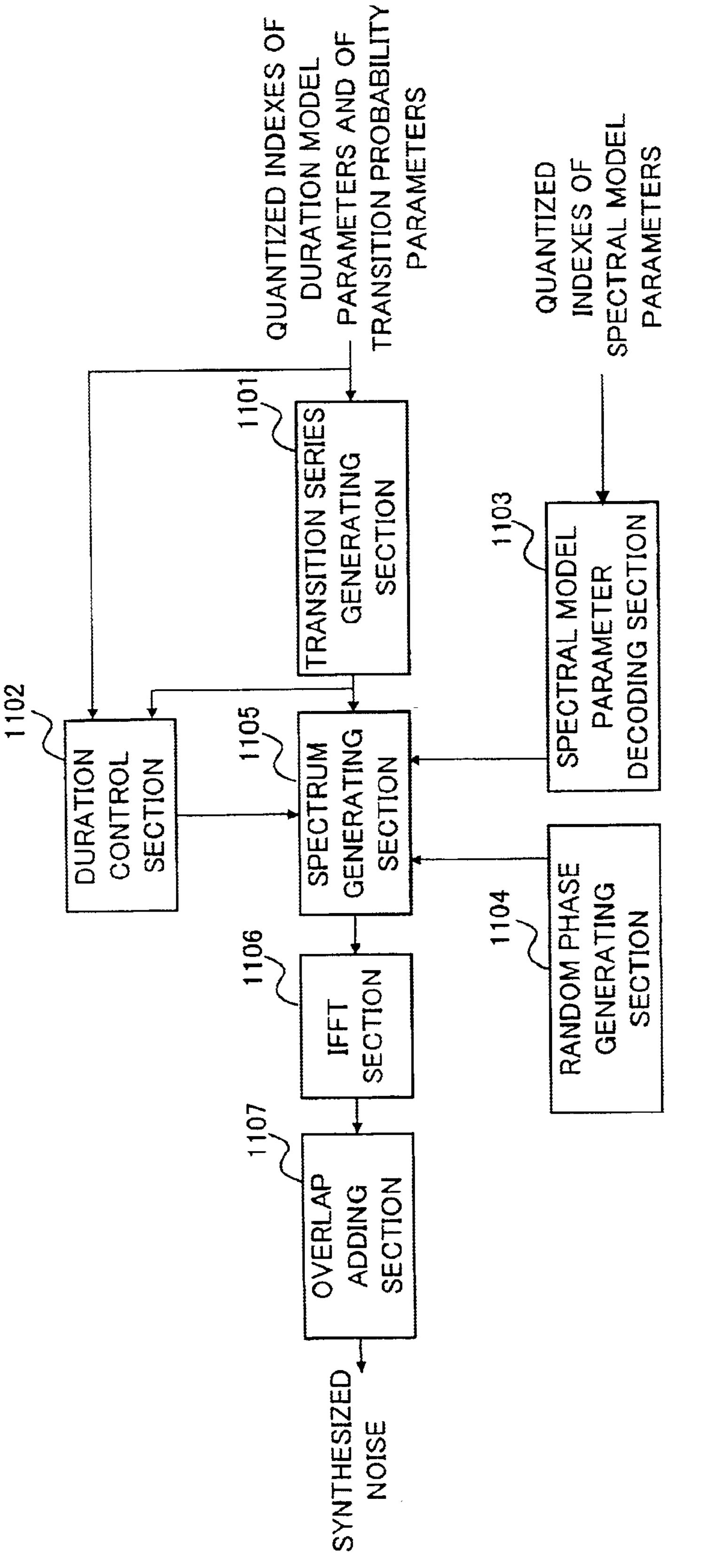
FIG. 12 is a block diagram illustrating a configuration of a noise signal synthesis apparatus according to the third embodiment of the present invention.

FIG. 12 is a block diagram illustrating a configuration of a noise signal synthesis apparatus according to the third embodiment of the present invention. In the noise signal synthesis apparatus illustrated in FIG. 12, using quantized indexes of transition probability p(i,j) between Si and Sj among statistical model parameter quantized indexes obtained in the noise signal analysis apparatus illustrated in FIG. 10, transition series generating section 1101 decodes transition probability p(i,j), and generates spectral model number transition series {index'(l)} (1≦index'(l)≦M, l=0, 1,2, . . . ) such that the transition of spectral model Si becomes given transition probability p(i,j). Spectral model parameter decoding section 1103 decodes average amplitude Sav_i and standard deviation Sdv_i (i=1, . . . , M) that are statistical parameters of spectral model Si from quantized indexes of spectral model parameters. The section 1103 decodes average amplitude Sav_i according to equation (2), using quantized indexes obtained in spectral model parameter calculating/quantizing section 903 in the coding apparatus, and typical vectors in the noise spectral typical vector storing section, the same as at the coding side, provided in spectral model parameter decoding section 1103. With respect to standard deviation Sdv_i, when using an inner-cluster standard deviation value corresponding to Ci obtained in learning noise spectral typical vectors in the coding apparatus, the section 1103 obtains a corresponding value from noise spectral typical vector storing section 1003 to decode. Using model number index'(l) obtained in transition series generating section 1101 and the model information (average amplitude Sav_i and standard deviation Sdv_i of Si) on spectral model Si (i=1, . . . , M) obtained in spectral model parameter decoding section 1103, spectrum generating section 1105 generates amplitude spectral time series {X'(n)}, indicated in the following equation, corresponding to index'(l):

$$\{X'(n)\}=\{S_{index'(l)}(n)\},\ n=1,2,\ .\ .\ .\ ,\ L \tag{3}$$

Herein, it is assumed that $S_{index'(l)}$ follows a normal distribution with average amplitude Sav_i and standard deviation Sdv_i with respect to i=index'(l), and number-of-successive frames L is controlled in duration control section 1102 to follow a normal distribution with average value Lav_i and standard deviation Ldv_i with respect to i=index'(l), using decoded values (average value Lav_i and standard deviation Ldv_i of Li) from quantized indexes of statistical model parameters of number-of-successive frames Li corresponding to spectral model Si output from the noise signal analysis apparatus.

Further, according to the above method, spectrum generating section 1105 adds random phases generated in random phase generating section 1104 to the amplitude spectral time series with a predetermined time duration (=NFRM that is the number of frames of a modeling interval) generated according to transition series {index'(l)}, and thereby generates a spectral time series. In addition, spectrum generating section 1105 may perform smoothing on the generated amplitude spectral time series so that the spectrum varies smoothly.

IFFT (Inverse Fast Fourier Transform) section 1106 transforms the spectral time series generated in spectrum generating section 1105 into a waveform of time domain. Overlap adding section 1107 superimposes overlapping signals between frames, and thereby outputs a final synthesized noise signal.

Operations of the noise signal analysis apparatus and noise signal synthesis apparatus with the above configurations will be described below with reference FIGS. 13 to 15.

First, the operation of the noise signal analysis apparatus according to this embodiment will be described with reference to FIG. 13. In step (hereinafter referred to as "ST") 1201, noise signal x(j) (j=0, . . . , N−1; N: analysis length) for each frame is input to windowing section 901. In ST1202 windowing section 901 performs windowing, for example, using a Hanning window, on the input noise signal corresponding to m-th frame (m=0,1,2, . . . ). In ST1203 FFT section 902 performs FFT (Fast Fourier Transform) on the windowed input noise signal to transform into a frequency spectrum. Input amplitude spectrum X(m) of the m-th frame is thereby calculated. In ST1204 spectral model parameter calculating/quantizing section 903 divides amplitude spectral series {X(m)} (m=0,1,2, . . . ) of the input noise signal into intervals with a predetermined number of frames or intervals with a number of frames adaptively determined according to some measure, uses each of the intervals as a unit interval (modeling interval) to model, calculates and quantizes spectral model parameters at the modeling interval, and outputs quantized indexes of the spectral model parameters. Further, the section 903 outputs spectral model number series {index(m)}(1≦index(m)≦M, m=mk, mk+1, mk+2, . . . , mk+NFRM−1; mk is a head frame number of a modeling interval, and NFRM is the number of frames at the modeling interval) corresponding to amplitude spectral series {X(m)} (m=0,1,2, . . . ) of the input noise signal. The spectral model parameters include average amplitude Sav_i and standard deviation Sdv_i that are statistical parameters of spectral model Si (i=1, . . . , M). The operation of spectral model parameter calculating/quantizing section 903 in ST1204 will be described specifically later with reference to FIG. 14.

In ST1205, using spectral model number series {index (m)} of the modeling interval obtained in ST1204, duration model/transition probability calculating/quantizing section 904 calculates and quantizes statistical parameters (duration model parameters) (average value Lav_i and standard deviation Ldv_i of Li) concerning number-of-successive frames Li corresponding to each Si and transition probability p(i,j) between Si and Sj, and outputs their quantized indexes. While an arbitrary quantizing method is capable of being used, each element of Lav_i, Ldv_i and p(i,j) may undergo scalar-quantization.

In ST1206, the above quantized indexes of spectral model parameters, duration model parameters, and transition probability parameters are output as statistical model parameter quantized indexes of the input noise signal at the modeling interval.

Figure 13:
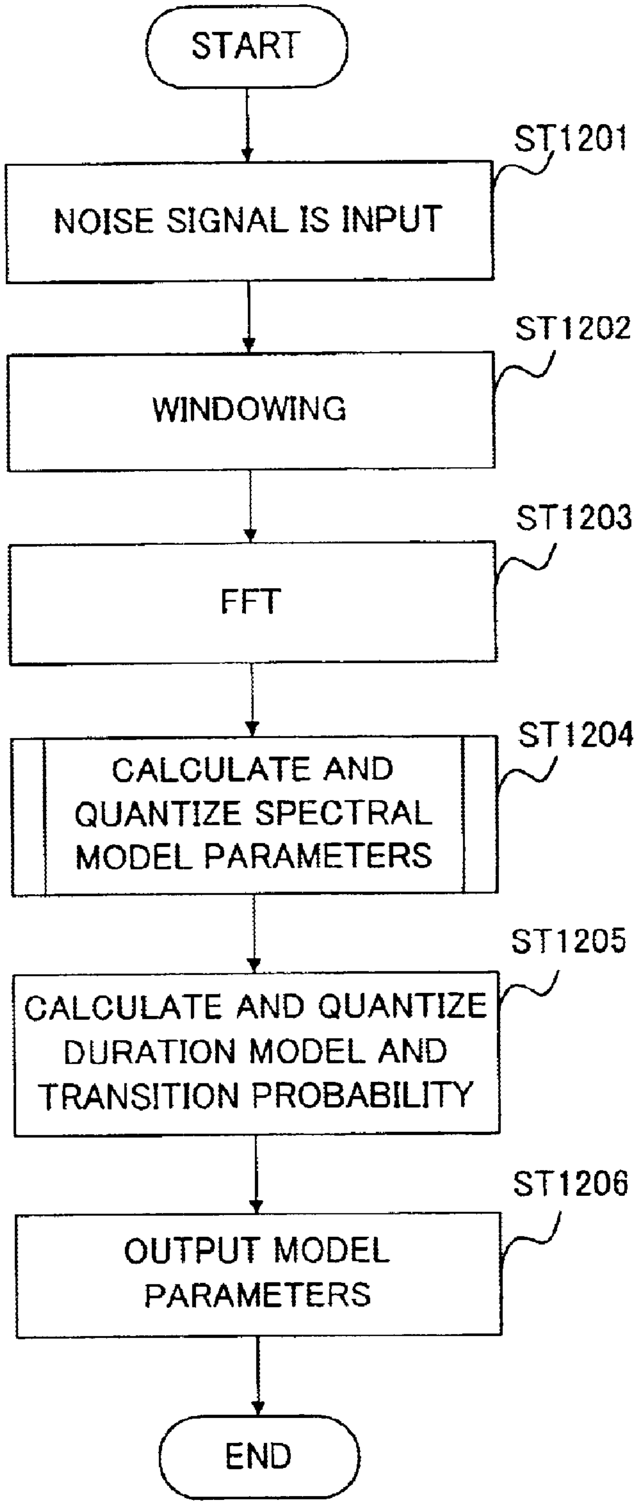
FIG. 13 is a flow diagram showing the operation of the noise signal analysis apparatus according to the third embodiment of the present invention.
Figure 14:
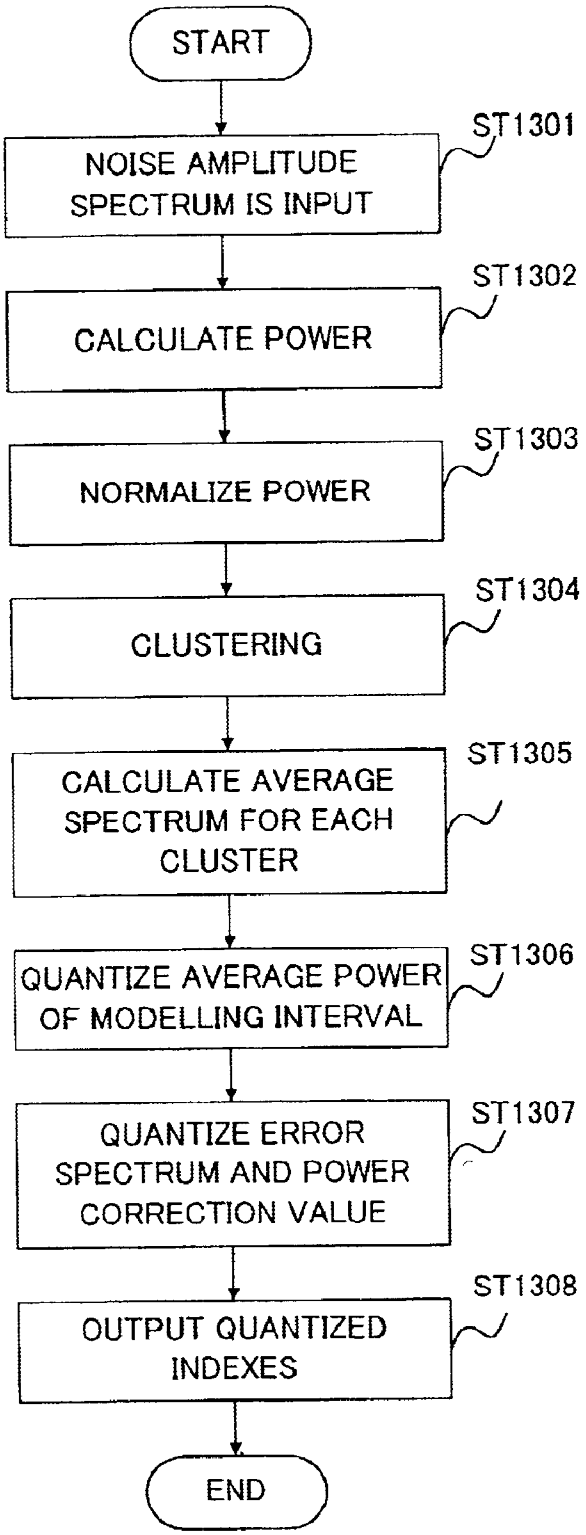
FIG. 14 is a flow diagram showing the operation of the spectral model parameter calculating/quantizing section according to the third embodiment of the present invention.
Figure 15:
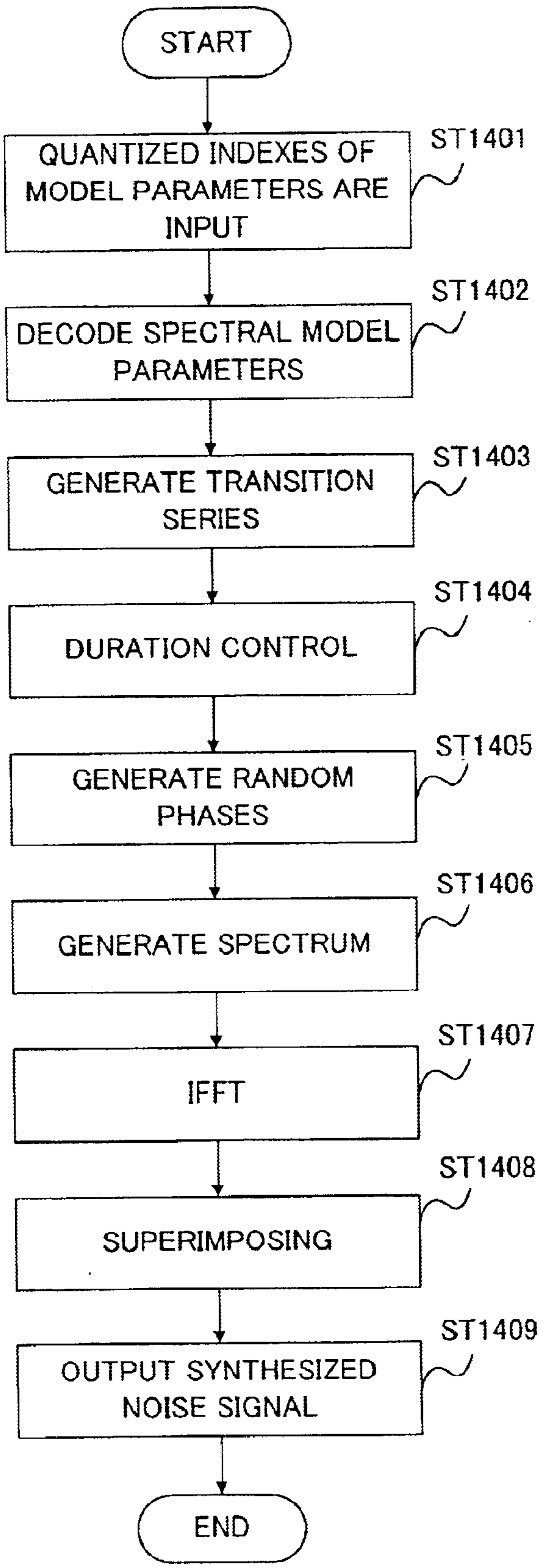
FIG. 15 is a flow diagram showing the operation of the noise signal synthesis apparatus according to the third embodiment of the present invention.

FIG. 14 is a flow diagram showing the specific operation of spectral model parameter calculating/quantizing section 903 in ST1204 in FIG. 13. The section 903 in this embodiment selects, from among typical vector sets of amplitude spectra representative of noise signals prepared in advance, a number (M) of models of typical vector suitable for representing the input amplitude spectral time series at the modeling interval of the input noise, and based on the models, calculates and quantizes spectral model parameters.

In ST1301, input amplitude spectrum X(m) (m=mk, mk+1, mk+2, . . . , mk+NFRM−1) of unit frame at the modeling interval is input. In ST1302, power calculating section 1001 calculates power of a frame with respect to the input amplitude spectrum. In ST1303 power normalizing section 1002 normalizes the power using power values calculated in power calculating section 1001. In ST1304 clustering section 1004 clusters (vector-quantizes) input amplitude spectra with normalized power into clusters each having as a cluster center a respective typical vector in noise spectral typical vector storing section 1003, and outputs information indicative of which cluster each of the input spectra belongs to. In ST1305, among series with cluster (typical vectors) numbers to which the input spectra belong obtained in clustering section 1004, each-cluster average spectrum calculating section 1005 selects higher-ranked M clusters (a corresponding typical vector is referred to as Ci (i=1,2, . . . M)) in descending order of frequency of belonging at the modeling interval, and calculates for each cluster an average spectrum of the input noise spectrum belonging to each of the cluster to prepare as average amplitude spectra Sav_i (i=1,2, . . . , M) of the spectral models. Further, the section 903 outputs spectral model number series {index (m)} (1≦index(m)≦M, m=mk, mk+1, mk+2, . . . , mk+NFRM−1) corresponding to amplitude spectral series {X(m)} of the input noise signal. The section 903 generates the number series as the number series belonging to higher-ranked M clusters, based on the series of cluster (typical vector) numbers to which the input spectra belong obtained in clustering section 1004. In other words, with respect to frames which do not belong to the higher-ranked M clusters, the section 903 associates the frames with numbers of the higher-ranked M clusters according to an arbitrary method (for example, re-clustering or replacing the number with a cluster number of a previous frame), or deletes such a frame from the series. In ST1306, modeling interval average power quantizing section 1006 averages the power values calculated for each frame in power calculating section 1001 over the entire modeling interval, quantizes the average power using an arbitrary method such as scalar-quantization, and outputs power indexes and modeling interval average power value (quantized value) E. In ST1307 with respect to Sav_i, as indicated in equation (2), represented using corresponding typical vector Ci, error spectrum di from Ci, modeling interval average power E and power correction value ei for E of each spectral model, error spectrum/power correction value quantizing section 1007 quantizes di and ei using an arbitrary method such as scalar-quantization.

It may be possible to quantize error spectrum di by dividing di into a plurality of bands and performing scalar-quantization on an average value of each band. In ST1308, M-typical vector indexes obtained in ST1305, error spectrum quantized indexes and power correction value quantized indexes obtained in ST1307, and power quantized indexes obtained in ST1306 are output as quantized indexes of spectral model parameters.

In addition, as standard deviation Sdv_i among the spectral model parameters, the section 903 uses an inner-cluster standard deviation value corresponding to Ci obtained in learning noise spectral typical vectors. Storing the value in advance in the noise spectral typical vector storing section eliminates the need of outputting quantized indexes. Further, in ST1305 it may be possible that each-cluster average spectrum calculating section 1005 calculates the standard deviation in the cluster also to quantize in calculating the average spectrum. In this case, the section 903 outputs the quantized indexes as part of the quantized indexes of the spectral model parameters.

In addition, while the above embodiment explains the quantization of error spectrum using scalar-quantization for each band, it may be possible to perform another quantization method such as vector-quantization on the entire band. Further, while it is explained that the power information is represented by average power of a modeling interval and correction value for average power for each model, it may be possible to represent the power information by only the power for each model or to uses the average power of a modeling interval as power of all the models.

The operation of the noise signal synthesis apparatus according to this embodiment will be described below with reference to FIG. 15. In ST1401 respective quantized indexes of statistical model parameters obtained in the noise signal analysis apparatus are input. In ST1402 spectral model parameter decoding section 1103 decodes average amplitude Sav_i and standard deviation Sdv_i (i=1, . . . , M) that are statistical parameters of spectral model Si from quantized indexes of spectral model parameters. In ST1403, using quantized indexes of transition probability p(i,j) between Si and Sj, transition series generating section 1101 decodes transition probability p(i,j), and generates spectral model number transition series {index'(l)} (1≦index'(l)≦M, l=0,1,2, . . . ) such that the transition of spectral model Si becomes given transition probability p(i,j).

In ST1404, using decoded values (average value Lav_i and standard deviation Ldv_i of Li) from quantized indexes of statistical model parameters of number-of-successive frames Li corresponding to spectral model Si, duration control section 1102 generates number-of-successive frames L controlled to follow a normal distribution with average amplitude Lav_i and standard deviation Ldv_i with respect to i=index'(l). In ST1405 random phase generating section 1104 generates random phases.

In ST1406 using model number index'(l) obtained in ST1403 and the model information (average amplitude Sav_i and standard deviation Sdv_i of Si) on spectral model Si (i=1, . . . , M) obtained in ST1402, spectrum generating section 1105 generates amplitude spectral time series {X'(n)}, indicated in equation (3), corresponding to index'(l).

Herein, it is assumed that $S_{index'(l)}$ follows a normal distribution with average amplitude Sav_i and standard deviation Sdv_i with respect to i=index'(l), and number-of-successive frames L is generated in ST1404. In addition, it may be possible to perform smoothing on the generated amplitude spectral time series so that the spectrum varies smoothly. Further, spectrum generating section 1105 adds random phases generated in ST1405 to the amplitude spectral time series with a predetermined time duration (=NFRM that is the number of frames of a modeling interval) generated according to transition series {index'(l)}, and thereby generates a spectral time series.

In ST1407 IFFT section 1106 transforms the generated spectral time series into a waveform of time domain. In ST1408 overlap adding section 1107 superimposes overlapping signals between frames. In ST1409 the superimposed signal is output as a final synthesized noise signal.

Thus, in this embodiment, a background noise is represented with statistical models. In other words, using a noise signal, the noise signal analysis apparatus (transmitting-side apparatus) generates statistical information (statistical model parameters) including spectral variations in the noise signal spectrum, and transmits the generated information to a noise signal synthesis apparatus (receiving-side apparatus). Using the information (statistical model parameters) transmitted from the noise signal analysis apparatus (transmitting-side apparatus), the noise signal synthesis apparatus (receiving-side apparatus) synthesizes a noise signal. In this way, the noise signal synthesis apparatus (receiving-side apparatus) is capable of using statistical information including spectral variations in the noise signal spectrum, instead of using a noise signal spectrum analyzed intermittently, to synthesize a noise signal, and thereby is capable of synthesizing a noise signal with less perceptual deterioration. Further, since statistical characteristics of a noise signal of an actual surrounding noise is expected to be constant over a relatively long period (for example, a few seconds to a few tens seconds), it is sufficient to set a transmit period of model parameters at such a long period. Therefore, an information amount of model parameters of a noise signal to be transmitted to a decoding side is reduced, and it is possible to achieve efficient transmission.

(Fourth embodiment)

This embodiment explains a case where a speech coding apparatus is achieved using the noise signal analysis apparatus as described in the third embodiment, and a speech decoding apparatus is achieved using the noise signal synthesis apparatus as described in the third embodiment.

Figure 16:
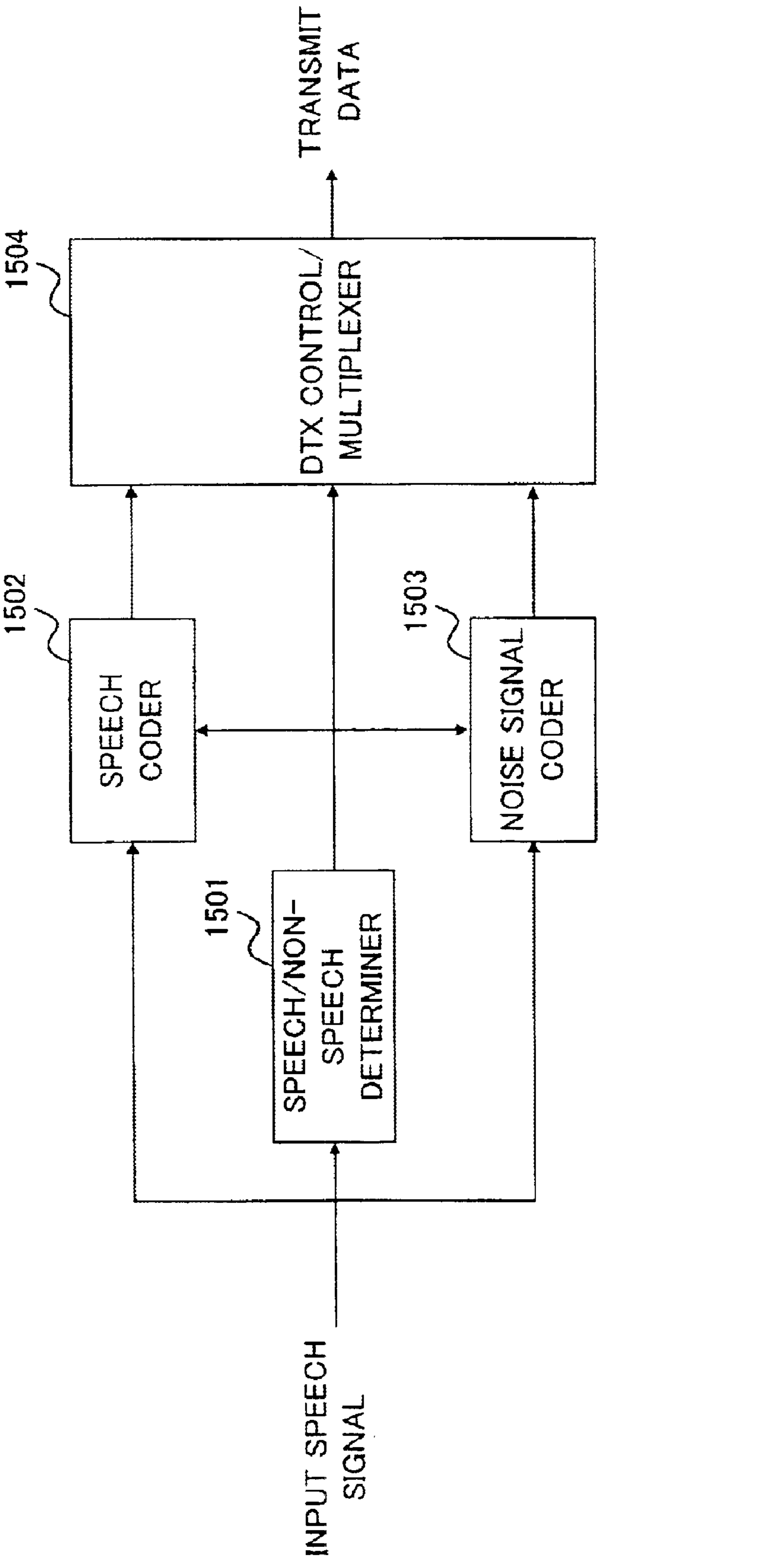
FIG. 16 is a block diagram illustrating a configuration of a speech coding apparatus according to a fourth embodiment of the present invention.

The speech coding apparatus according to this embodiment will be described below with reference to FIG. 16. FIG. 16 is a block diagram illustrating a configuration of the speech coding apparatus according to the fourth embodiment of the present invention. In FIG. 16 an input speech signal is input to speech/non-speech determiner 1501, noise coder 1502 and noise signal coder 1503.

Speech/non-speech determiner 1501 determines whether the input speech signal is of a speech interval or non-speech interval (interval with only a noise), and outputs a determination. Speech/non-speech determiner 1501 may be an arbitrary one, and in general, one using momentary amounts, variation amounts or the like of a plurality of parameters such as power, spectrum and pitch period of the input signal to make a determination.

When speech/non-speech determiner 1501 determines that the input speech signal is of speech, speech coder 1502 performs speech coding on the input speech signal, and outputs coded data to DTX control/multiplexer 1504. Speech coder 1502 is one for speech interval, and is an arbitrary coder that encodes speech with high efficiency.

When speech/non-speech determiner 1501 determines that the input speech signal is of non-speech, noise signal coder 1503 performs noise signal coding on the input speech signal, and outputs, as coded data, quantized indexes of statistical model parameters corresponding to the input noise signal. As noise signal coder 1503, the noise signal analysis apparatus (FIG. 10) as described in the third embodiment is used.

Using outputs from speech/non-speech determiner 1501, speech coder 1502 and noise signal coder 1503, DTX control/multiplexer 1504 controls information to be transmitted as transmit data, multiplexes transmit information, and outputs the transmit data.

Figure 17:
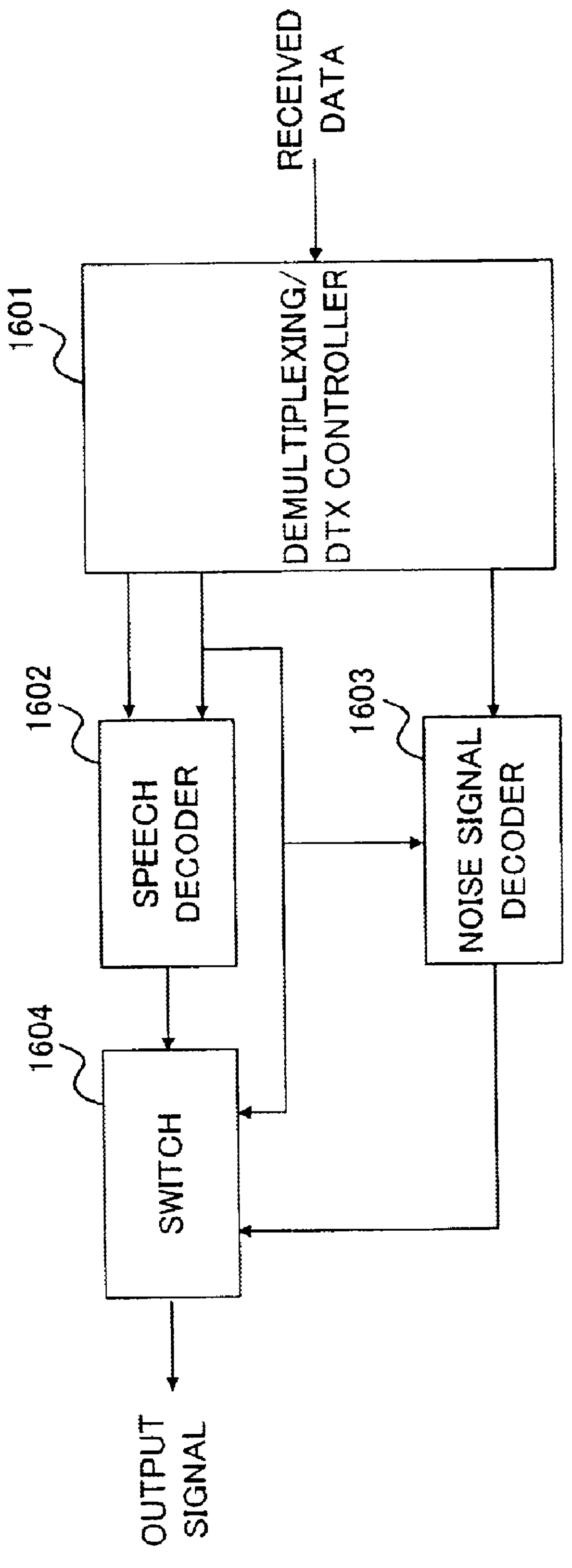
FIG. 17 is a block diagram illustrating a configuration of a speech decoding apparatus according to the fourth embodiment of the present invention.

The speech decoding apparatus according to the fourth embodiment of the present invention will be described below with reference to FIG. 17. FIG. 17 is a block diagram illustrating a configuration of the speech decoding apparatus according to the fourth embodiment of the present invention. In FIG. 17 transmit data transmitted from the speech coding apparatus illustrated in FIG. 16 is input to demultiplexing/DTX controller 1601 as received data.

Demultiplexing/DTX controller 1601 demultiplexes the received data into speech coded data or noise model coded parameters and a speech/non-speech determination flag required for speech decoding and noise generation.

When the speech/non-speech determination flag is indicative of speech interval, speech decoder 1602 performs speech decoding using the speech coded data, and outputs a decoded speech. When the speech/non-speech determination flag is indicative of non-speech interval, noise signal decoder 1603 generates a noise signal using the noise model coded parameters, and outputs the noise signal. As noise signal decoder 1603, the noise signal synthesis apparatus (FIG. 12) as described in the third embodiment is used.

Output switch 1604 switches outputs of speech decoder 1602 and noise signal decoder 1603 corresponding to the result of speech/non-speech flag to output as an output signal.

Figure 18:
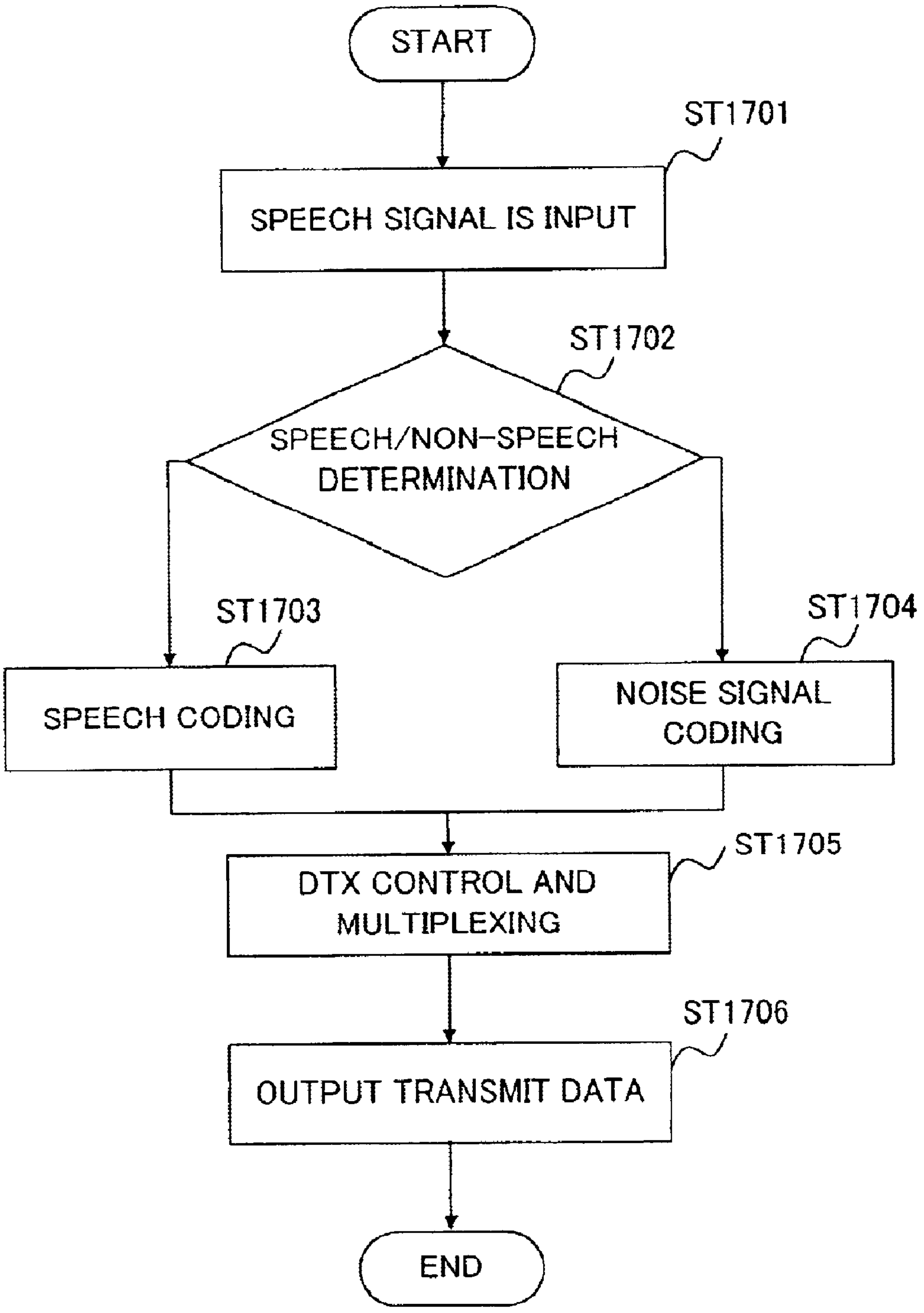
FIG. 18 is a flow diagram showing the operation of the speech coding apparatus according to the fourth embodiment of the present invention.

Operations of the speech coding apparatus and speech decoding apparatus with the above configurations will be described below. First, the operation of the speech coding apparatus will be described with reference to FIG. 18. FIG. 18 is a flow diagram showing the operation of speech coding apparatus according to the fourth embodiment of the present invention.

In ST1701 a speech signal for each frame is input. In ST1702 the input speech signal is determined as a speech interval or non-speech interval (interval with only a noise), and a determination is output. The speech/non-speech determination is made by arbitrary method, and in general, is made using momentary amounts, variation amounts or the like of a plurality of parameters such as power, spectrum and pitch period of the input signal.

When the speech/non-speech determination is indicative of speech in ST1702, in ST1703 speech coding is performed on the input speech signal, and the coded data is output. The speech coding processing is coding for speech interval and is performed by arbitrary method for coding a speech with high efficiency.

Meanwhile, when the speech/non-speech determination is indicative of non-speech, in ST1704 noise signal coding is performed on the input speech signal, and model parameters corresponding to the input noise signal are output. As the noise signal coding, the noise signal analysis method as described in the third embodiment is used.

In ST1705 using outputs of speech/non-speech determination, speech coding and noise signal coding, information to be transmitted as transmit data is controlled (DTX control), and transmit information is multiplexed. In ST1706 the resultant is output as the transmit data.

Figure 19:
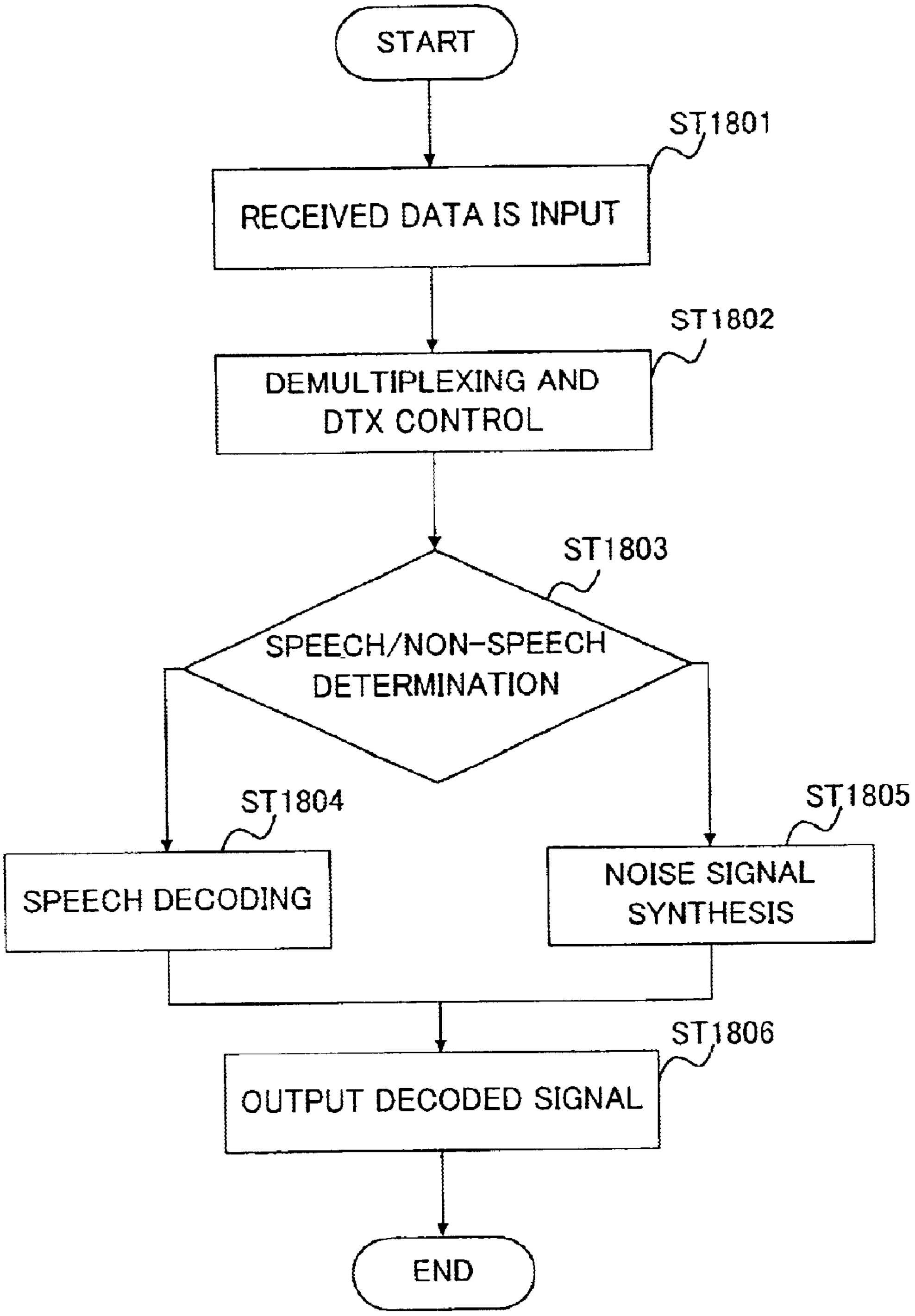
FIG. 19 is a flow diagram showing the operation of the speech decoding apparatus according to the fourth embodiment of the present invention.

The operation of the speech decoding apparatus will be described below with reference to FIG. 19. FIG. 19 is a flow diagram showing the operation of the speech decoding apparatus according to the fourth embodiment of the present invention.

In ST1801 transmit data obtained by coding an input signal at a coding side is received as received data. In ST1802 the received data is demultiplexed into speech coded data or noise model coded parameters and a speech/non-speech determination flag required for speech decoding and noise generation.

When the speech/non-speech determination flag is indicative of speech interval, in ST1804 speech decoding is performed using the speech coded data, and a decoded speech is output. When the speech/non-speech determination flag is indicative of non-speech interval, in ST1805 a noise signal is generated using the noise model coded parameters, and a noise signal is output. As the noise signal decoding processing, the noise signal synthesis method as described in the third embodiment is used.

In ST1806 corresponding to the result of speech/non-speech flag, an output of speech decoding in ST1804 or of noise signal decoding in ST1805 is output as a decoded signal.

In addition, while the above embodiment explains that a decoded signal is output while switching a decoded speech signal and synthesized noise signal corresponding to speech interval and non-speech interval, as another aspect, it may be possible to add a noise signal synthesized at a non-speech interval to a decoded speech signal also at a speech interval to output. Further, it may be possible that a coding side is provided with a means for separating an input speech signal including a noise signal into the noise signal and speech signal with no noise, and using coded data of the separated speech signal and noise signal, a decoding side adds a noise signal synthesized at a non-speech interval to a decoded speech signal also at a speech interval to output as in the above case.

Thus, according to this embodiment, speech coding enabling coding of a speech signal with high quality is performed at a speech interval, while at a non-speech interval, a noise signal is coded and decoded using a noise signal analysis apparatus and synthesis apparatus with less perceptual deterioration. It is thereby possible to perform coding of high quality even in circumstances with a background noise. Further, since statistical characteristics of a noise signal of an actual surrounding noise is expected to be constant over a relatively long period (for example, a few seconds to a few tens seconds), it is sufficient to set a transmit period of model parameters at such a long period. Therefore, an information amount of model parameters of a noise signal to be transmitted to a decoding side is reduced, and it is possible to achieve efficient transmission.

Further, it may be possible to achieve, using software (program), the processing performed by any one of the noise signal analysis apparatuses and noise signal synthesis apparatuses as explained in above embodiments 1 and 3 and speech coding apparatuses and speech decoding apparatuses as explained in above embodiments 2 and 4, and store the software (program) in a computer readable storage medium.

As is apparent from the foregoing, according to the present invention, it is possible to synthesize a noise signal with less perceptual deterioration by representing the noise signal with statistical models.

This application is based on the Japanese Patent Applications No. 2000-270588 and No. 2001-070148 filed on Sep. 6, 2000 and on Mar. 13, 2001 entire contents of which are expressly incorporated by reference herein.

Industrial Applicability

The present invention relates to a noise signal analysis apparatus and synthesis apparatus for analyzing and synthesizing a background noise signal superimposed on a speech signal, and is suitable for a speech coding apparatus for coding the speech signal using the analyzing apparatus and synthesis apparatus.

What is claimed is:

1. A noise signal analysis apparatus comprising:

frequency transforming means for transforming a first noise signal into a signal of frequency domain to calculate a spectrum of the first noise signal;

first storing means for storing a plurality of pieces of model information concerning a spectrum of a first stationary noise model;

selecting means for selecting, among the plurality of pieces of model information, a piece of model information corresponding to the spectrum of the first noise signal based on a predetermined condition; and information generating means for generating statistical parameters concerning said first stationary noise model and first transition probability information, which identifies a probability of transiting between a plurality of first stationery noise models, using a timewise series of the selected model information.

2. A noise signal synthesis apparatus comprising noise signal generating means for generating a second noise signal using the statistical parameters and the first transition probability information generated in the noise signal analysis apparatus according to claim 1.

3. The noise signal synthesis apparatus according to claim 2, further comprising:

transition series generating means for generating information on a transition series of a second stationary noise model, using second transition probability information that is a probability of transiting between a plurality of second stationary noise models;

duration calculating means for calculating a duration of the second stationary noise model using statistical parameters concerning the second stationary noise model;

second storing means for storing model information on a spectrum of the second stationary noise model;

random phase generating means for generating random phases;

spectrum generating means for generating a spectral time series using the generated information on the transition series of the second stationary noise model, the calculated duration, the stored model information on the spectrum of the second stationary noise model, and the generated random phases; and inverse frequency transforming means for transforming the generated spectral time series into a signal of time domain.

4. A speech coding apparatus that performs coding on the first noise signal at a non-speech interval of a speech signal, using the noise signal analysis apparatus according to claim 1.

5. A speech decoding apparatus that performs decoding on the second noise signal at a non-speech interval of a speech signal, using the noise signal synthesis apparatus according to claim 2.

6. A noise signal analysis apparatus comprising:

frequency transforming means for transforming a first noise signal into a signal of frequency domain to calculate a spectrum of the first noise signal;

spectral model parameter calculating/quantizing means for calculating and quantizing spectral model parameters that are statistical parameters concerning an amplitude spectral time series of a first stationary noise model to output first quantized indexes; and duration model/transition probability calculating/quantizing means for calculating and quantizing statistical parameters concerning a duration of the amplitude spectral time series of the first stationary noise model and first transition probability information, which identifies a probability of transiting between a plurality of first stationery noise models, to output second quantized indexes.

7. The noise signal analysis apparatus according to claim 6, wherein the spectral model parameter calculating/quantizing means further comprise:

power normalizing means for normalizing power of an amplitude spectrum of an input noise signal obtained in the frequency transforming means;

storing means for storing typical vector sets of amplitude spectra, each representing a different noise signal;

clustering means for clustering amplitude spectra with power normalized obtained in the power normalizing means, using the typical vector sets stored in the storing means;

each-cluster average spectrum calculating means for selecting a plurality of clusters in descending order of frequency of selection for each modeling interval of the input noise signal, and calculating for each cluster an average spectrum of an input amplitude spectrum belonging to the selected cluster;

modeling interval average power quantizing means for calculating average power of a modeling interval of the input noise signal to quantize; and error spectrum/power correction value quantizing means for quantizing an error spectrum for each cluster and a power correction value for the average power of the modeling interval, using the average spectrum of each cluster obtained in the each-cluster average spectrum calculating means and quantized average power of the modeling interval obtained in the modeling interval average power quantizing means.

8. A noise signal synthesis apparatus comprising noise signal generating means for generating a second noise signal using the first and second quantized indexes generated in the noise signal analysis apparatus according to claim 6.

9. The noise signal synthesis apparatus according to claim 8, further comprising:

transition series generating means for generating information on a transition series of a second stationary noise model, using quantized indexes of second transition probability information, which identifies a probability of transiting between a plurality of second stationary noise models;

duration calculating means for calculating a duration of the second stationary noise model using quantized indexes of statistical parameters concerning the duration;

spectral model parameter decoding means for decoding spectral model parameters of the second stationary noise model using quantized indexes of the spectral model parameters;

random phase generating means for generating random phases;

spectrum generating means for generating a spectral time series using the generated information on the transition series of the second stationary noise model, the calculated duration, the decoded spectral model parameters of the second stationary noise model, and the generated random phases; and inverse frequency transforming means for transforming the generated spectral time series into a signal of time domain.

10. A speech coding apparatus that performs coding on the first noise signal at a non-speech interval of a speech signal, using the noise signal analysis apparatus according to claim 6.

11. A speech decoding apparatus that performs decoding on a second noise signal at a non-speech interval of a speech signal, using the noise signal synthesis apparatus according to claim 8.

12. A noise signal analysis method comprising:

frequency transforming a noise signal into a signal of frequency domain to calculate a spectrum of the noise signal;

storing a plurality of piece of model information concerning a spectrum of a first stationary noise model;

selecting, among the plurality of piece of model information, a piece of model information corresponding to the spectrum of the noise signal based on a predetermined condition; and generating statistical parameters concerning said first stationary noise model and first transition probability information, which identifies a probability of transiting between a plurality of first stationery noise models, using a timewise series of the selected model information.

13. The noise signal synthesis method of claim 12, further comprising:

generating information on a transition series of a second stationary noise model, using second transition probability information, which identifies a probability of transiting between a plurality of second stationary noise models;

calculating a duration of the second stationary noise model using statistical parameters concerning the second stationary noise model;

storing model information on a spectrum of the second stationary noise model;

generating random phases;

generating a spectral time series using the generated information on the transition series of the second stationary noise model, the calculated duration, the stored model information on the spectrum of the second stationary noise model, and the generated random phases; and inverse frequency transforming the generated spectral time series into a signal of time domain.

14. A noise signal analysis method comprising:

frequency transforming a first noise signal into a signal of frequency domain to calculate a spectrum of the first noise signal;

calculating and quantizing spectral model parameters that are statistical parameters concerning an amplitude spectral time series of a first stationary noise model to output first quantized indexes; and calculating and quantizing statistical parameters concerning a duration of the amplitude spectral time series of the first stationary noise model and first transition probability information, which identifies a probability of transiting between a plurality of first stationery noise models, to output second quantized indexes.

15. The noise signal analysis method according to claim 14, wherein the spectral model parameter calculating/quantizing step further comprises:

normalizing power of an amplitude spectrum of an input noise signal obtained in the frequency transforming step;

storing typical vector sets of amplitude spectra, each representing a different noise signal;

clustering amplitude spectra with power normalized obtained in the power normalizing step, using the typical vector sets stored in the storing step;

selecting a plurality of clusters in descending order of frequency of selection for each modeling interval of the input noise signal, and calculating for each cluster an average spectrum of an input amplitude spectrum belonging to the selected cluster;

calculating average power of a modeling interval of the input noise signal to quantize; and quantizing an error spectrum for each cluster and a power correction value for the average power of the modeling interval, using the average spectrum of each cluster obtained in each-cluster average spectrum calculating step and quantized average power of the modeling interval obtained in the modeling interval average power quantizing step.

16. The noise signal synthesis method of claim 14, further comprising:

generating information on a transition series of a second stationary noise model, using quantized indexes of second transition probability information, which identifies a probability of transiting between a plurality of second stationary noise models;

calculating a duration of the second stationary noise model using quantized indexes of statistical parameters concerning the duration;

decoding the spectral model parameters of the second stationary noise model using quantized indexes of the spectral model parameters;

generating random phases;

generating a spectral time series using the generated information on the transition series of the second stationary noise model, the calculated duration, the decoded spectral model parameters of the second stationary noise model, and the generated random phases; and inverse frequency transforming the generated spectral time series into a signal of time domain.

17. A program for operating a computer to have functions of:

frequency transforming means for transforming a noise signal into a signal of frequency domain to calculate a spectrum of the noise signals;

storing means for storing a plurality of pieces of model information concerning a spectrum of a first stationary noise model;

selecting means for selecting, among the plurality of pieces of model information, a piece of model information corresponding to the spectrum of the noise signal based on a predetermined condition; and information generating means for generating statistical parameters concerning said first stationary noise model and transition probability information, which identifies a probability of transiting between a plurality of stationery noise models, using a timewise series of the selected model information.

18. A program for operating a computer to have functions of:

transition series generating means for generating information on a transition series of a stationary noise model, using transition probability information that identifies a probability of transiting between a plurality of stationary noise models;

duration calculating means for calculating a duration of the stationary noise model using statistical parameters concerning the stationary noise model;

storing means for storing model information on a spectrum of the stationary noise model;

random phase generating means for generating random phases;

spectrum generating means for generating a spectral time series using the generated information on the transition series of the stationary noise model, the calculated duration, the stored model information on the spectrum of the stationary noise model, and the generated random phases; and inverse frequency transforming means for transforming generated spectral time series into a signal of time domain.

19. A noise signal analysis apparatus comprising:

frequency transforming means for transforming a noise signal into a signal of frequency domain to calculate a spectrum of the noise signal;

spectral model parameter calculating means for calculating spectral model parameters that are statistical parameters concerning an amplitude spectral time series of a stationary noise model;

spectral model parameter quantizing means for quantizing said spectral model parameters to output quantized indexes; and duration model/transition probability calculating/quantizing means for calculating and quantizing statistical parameters concerning a duration of said amplitude spectral time series of the stationary noise model and transition probability information that is a probability of transiting between a plurality of stationary noise models to output quantized indexes.

* * * * *